(12) United States Patent
Sharon et al.

(10) Patent No.: US 11,775,522 B2
(45) Date of Patent: Oct. 3, 2023

(54) SURROGATE DATA GENERATION OF PRIVATE DATA

(71) Applicant: Pacific Investment Management Company LLC, Newport Beach, CA (US)

(72) Inventors: Avi Sharon, Brooklyn, NY (US); Scott Thomson, North Tustin, CA (US); Daniel Noonan, Larchmont, NY (US); Ryan Leshaw, Laguna Niguel, CA (US); Masoud Sharif, Newport Beach, CA (US); Rama Nambimadom, Irvine, CA (US)

(73) Assignee: Pacific Investment Management Company LLC, Newport Beach, CA (US)

( * ) Notice: Subject to any disclaimer, the term of this patent is extended or adjusted under 35 U.S.C. 154(b) by 44 days.

(21) Appl. No.: 17/452,379

(22) Filed: Oct. 26, 2021

(65) Prior Publication Data

US 2022/0138190 A1    May 5, 2022

Related U.S. Application Data

(60) Provisional application No. 63/107,352, filed on Oct. 29, 2020.

(51) Int. Cl.
  *G06F 16/2455*    (2019.01)
(52) U.S. Cl.
  CPC ................... *G06F 16/2455* (2019.01)
(58) Field of Classification Search
  CPC ................................. G06F 16/2455
  (Continued)

(56) References Cited

U.S. PATENT DOCUMENTS 5,835,087 A * 11/1998 Herz .................. H04N 21/2223
                                                            348/E7.071
6,460,036 B1 * 10/2002 Herz .................. H04N 21/4755
                                                            348/E7.071
(Continued)

FOREIGN PATENT DOCUMENTS

| EP | 2851862 A1 | 3/2015 |
| EP | 3413225 A1 | 6/2018 |
| WO | WO 2022/093851 | 5/2022 |

OTHER PUBLICATIONS

Fidelity Beach Street Trust, et al., Application filed Nov. 8, 2019, File No. 812-14364, https://www.sec.gov/Archives/edgar/data/35336/000119312519287794/d829357d40appa.htm, downloaded Feb. 22, 2023, 73 pages.

(Continued)

*Primary Examiner* — Hanh B Thai
(74) *Attorney, Agent, or Firm* — Knobbe, Martens, Olson & Bear LLP

(57) ABSTRACT

Features are disclosed for dynamically generating a proxy representation of characteristics associated with a private data set. A computing device can receive a private data set including private or proprietary information. The compute device can determine one or more characteristics that are associated with the private data set. The computing device can further receive a public data library that includes characteristics that are publicly available. The computing device may generate a proxy representation based on the public data library and the proxy representation may include one or more characteristics that represent the private data set. The proxy representation may be provided to one or more entities who are unauthorized to access the private data set. In some embodiments, the private data set may correspond to an exchange traded fund and the characteristics may (Continued)

correspond to risk factors associated with the exchange traded fund.

20 Claims, 8 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 7,630,986 | B1* | 12/2009 | Herz | G06Q 30/0603 |
| | | | | 707/999.009 |
| 7,698,202 | B2 | 4/2010 | Stubbs et al. | |
| 7,788,283 | B2* | 8/2010 | Wakeam | G06V 30/32 |
| | | | | 707/810 |
| 7,813,987 | B1 | 10/2010 | Kuhnle et al. | |
| 7,925,562 | B2 | 4/2011 | Kuhnle et al. | |
| 7,937,311 | B1 | 5/2011 | Zangari et al. | |
| 8,166,042 | B1* | 4/2012 | Praun | G06F 16/29 |
| | | | | 707/921 |
| 8,315,936 | B2 | 11/2012 | Stubbs et al. | |
| 8,380,630 | B2* | 2/2013 | Felsher | G06F 21/6227 |
| | | | | 705/50 |
| 8,446,299 | B2* | 5/2013 | van den Boom | H04N 19/91 |
| | | | | 709/205 |
| 8,484,241 | B2* | 7/2013 | Bouse | H04L 67/306 |
| | | | | 705/37 |
| 8,533,089 | B1 | 9/2013 | Renshaw | |
| 8,533,107 | B2 | 9/2013 | Bell et al. | |
| 8,572,119 | B2* | 10/2013 | Savage | H04L 9/3271 |
| | | | | 713/193 |
| 8,656,189 | B2* | 2/2014 | Orsini | H04L 9/3247 |
| | | | | 718/1 |
| 8,661,047 | B2* | 2/2014 | Talwar | G06F 16/245 |
| | | | | 707/705 |
| 8,700,516 | B2 | 4/2014 | Bell et al. | |
| 8,756,140 | B1 | 6/2014 | Menchero et al. | |
| 8,843,998 | B2* | 9/2014 | Fu | H04L 63/0272 |
| | | | | 709/201 |
| 8,887,254 | B2* | 11/2014 | Spalka | H04L 63/0421 |
| | | | | 713/176 |
| 9,015,480 | B2* | 4/2015 | Orsini | H04L 9/3263 |
| | | | | 705/52 |
| 10,109,017 | B2 | 10/2018 | Bothwell et al. | |
| 10,825,091 | B2 | 11/2020 | Roberts et al. | |
| 10,915,962 | B2 | 2/2021 | Stubbs et al. | |
| 2002/0095454 | A1* | 7/2002 | Reed | H04L 67/51 |
| | | | | 709/212 |
| 2003/0021417 | A1* | 1/2003 | Vasic | H04L 9/3263 |
| | | | | 713/155 |
| 2003/0037041 | A1* | 2/2003 | Hertz | H04N 21/454 |
| | | | | 348/E7.071 |
| 2003/0063771 | A1* | 4/2003 | Morris | G06F 16/58 |
| | | | | 707/E17.026 |
| 2004/0103147 | A1 | 5/2004 | Flesher et al. | |
| 2008/0168135 | A1* | 7/2008 | Redlich | G06F 16/282 |
| | | | | 709/204 |
| 2008/0243786 | A1* | 10/2008 | Stading | G06F 16/951 |
| 2009/0254572 | A1* | 10/2009 | Redlich | G06Q 10/06 |
| 2010/0241595 | A1* | 9/2010 | Felsher | G16H 10/65 |
| | | | | 707/E17.014 |
| 2010/0250497 | A1* | 9/2010 | Redlich | H04L 63/105 |
| | | | | 707/661 |
| 2011/0282865 | A1* | 11/2011 | Talwar | G06F 16/245 |
| | | | | 707/769 |
| 2012/0109882 | A1* | 5/2012 | Bouse | H04L 67/306 |
| | | | | 707/E17.107 |
| 2015/0012467 | A1* | 1/2015 | Greystoke | G06Q 30/0619 |
| | | | | 706/12 |
| 2015/0088874 | A1* | 3/2015 | Mion | G06F 16/9024 |
| | | | | 707/726 |
| 2015/0242503 | A1* | 8/2015 | Buehler | G06F 40/186 |
| | | | | 707/722 |
| 2015/0242528 | A1* | 8/2015 | Buehler | H04L 67/02 |
| | | | | 707/736 |
| 2016/0019218 | A1* | 1/2016 | Zhang | G06Q 40/04 |
| | | | | 707/727 |
| 2016/0179839 | A1* | 6/2016 | Sundaram | G06F 21/78 |
| | | | | 707/639 |
| 2016/0380986 | A1* | 12/2016 | Millar | G06F 16/955 |
| | | | | 709/206 |
| 2017/0006343 | A1* | 1/2017 | Miller | H04N 21/4524 |
| 2017/0076281 | A1 | 3/2017 | Dawkins et al. | |
| 2017/0279826 | A1* | 9/2017 | Mohanty | H04L 67/1004 |
| 2018/0018590 | A1 | 1/2018 | Szeto et al. | |
| 2018/0210926 | A1* | 7/2018 | Schulze | G06F 16/258 |
| 2019/0147455 | A1* | 5/2019 | Wang | G06F 16/24578 |
| | | | | 707/723 |

OTHER PUBLICATIONS

Fidelity Beach Street Trust, et al., Application filed Dec. 16, 2019, File No. 812-[], https://www.sec.gov/Archives/edgar/data/35336/000119312519314931/d842423d40app.htm, downloaded Feb. 22, 2023, 78 pages.

Fidelity Beach Street Trust, et al., Notice of Application, Nov. 14, 2019, File No. 812-14364, https://www.sec.gov/rules/ic/2019/ic-33683.pdf, downloaded Feb. 22, 2023, 27 pages.

Matheos, et al., "The PROTEUS Commodity Risk Model", PIMCO quantitative research, https://www.pimco.com/en-US/insights/viewpoints/research/the-proteus-commodity-risk-model Nov. 2013, 10 pages.

Tetko, I. et al., "Surrogate date - a secure way to share corporate data", Journal of Computer-Aided Molecular Design (2005) 19: 749-764, https://zdoc.pub/surrogate-data-a-secure-way-to-share-corporate-data.html published Oct. 2005.

International Search Report and Written Opinion for PCT Application No. PCT/US2021/056695 dated Jan. 17, 2022 in 11 pages.

* cited by examiner

300

1) Obtain private data set
Holdings

| Security Type | Description | % of Net Assets |
|---|---|---|
| Mortgage Pass Thru | FNMA TBA 2.5% OCT 30YR | 6.37% |
| Government | US TREASURY BOND | 4.69% |
| Mortgage Pass Thru | FNMA TBA 2.5% NOV 30YR | 3.38% |
| Repo | REPO | 3.08% |
| Repo | REPO | 2.95% |
| Repo | REPO | 2.76% |
| Mortgage Pass Thru | FH/MC GOLD 30YR #V8-3421 | 2.35% |
| Mortgage Pass Thru | FNMA PASS THRU 30YR #RA0365 | 2.25% |
| Mortgage Pass Thru | FNMA PASS THRU 30YR #MA4579 | 2.21% |
| Government | US TREASURY BOND | 1.37% |
| Corporate | HAMPTON ROADS PPV LLC UNSEC | 1.06% |
| Mortgage Pass Thru | FH/MC GOLD 30YR GNT #G0-8788 | 1.50% |
| Mortgage Pass Thru | FNMA PASS THRU 30YR #MA3210 | 1.03% |
| Interest Rate Swap - Receiver | IRS CAD 1.275000 03/03/20-5Y KH | 1.01% |
| Interest Rate Swap - Receiver | IRS CAD 1.25000 03/04/20-5Y KG | 0.91% |
| Corporate | BANK OF AMERICA CORP SR UNSEC | 0.80% |
| Mortgage Pass Thru | FH/MC GOLD 30YR GNT #G6-0767 | 0.61% |
| Interest Rate Swap - Receiver | IRS CAD 1.275000 03/03/20-5Y KH | 0.66% |
| Corporate | JP MORGAN CHASE & CO SR UNSEC | 0.60% |
| Mortgage Pass Thru | GNMA II MULTIPL SGL 30YR #784296X | 0.55% |
| Corporate | MORGAN STANLEY SR UNSEC | 0.55% |
| Mortgage Pass Thru | FH/MC GOLD 30YR GNT #G0-6888 | 0.54% |
| Corporate | ORACLE CORP SR UNSEC | 0.50% |
| Corporate | UBS AG STAMFORD CT GLBL SUB | 0.49% |
| Mortgage Pass Thru | FNMA PASS THRU 30YR #CA3079 | 0.48% |
| Government | US TREASURY BILLS | 0.48% |
| Mortgage Pass Thru | GN&A PASS THRU SGL 30YR #8456313X | 0.47% |

27 of 978 holdings on 8/28/20 =
Daily TE of 5-15 bps

2) Determine characteristics associated with private data set

Risk Factors

Portfolio Capture
(explanatory power)

Daily Tracking Error: 5-25 bps

| | |
|---|---|
| HY CDX | $R^2 = .80$ |
| Agency MBS Spread | $R^2 = .75$ |
| IG CDX | $R^2 = .70$ |
| US Duration | $R^2 = .55$ |

FIG. 4

SURROGATE DATA GENERATION OF PRIVATE DATA

INCORPORATION BY REFERENCE TO ANY PRIORITY APPLICATIONS

This application claims the benefit of priority of U.S. Provisional Patent Application No. 63/107,352 filed Oct. 29, 2020, entitled "SURROGATE DATA GENERATION OF PRIVATE DATA," which is hereby incorporated by reference herein in its entirety and for all purposes.

Any and all applications for which a foreign or domestic priority claim is identified in the Application Data Sheet as filed with the present application are hereby incorporated by reference under 37 CFR 1.57.

SUMMARY

The systems, methods, and devices described herein each have several aspects, no single one of which is solely responsible for its desirable attributes. Without limiting the scope of this disclosure, several non-limiting features will now be described briefly. It should be understood that any of the embodiments described herein can be combined with any other embodiment disclosed herein except where contradictory.

According to various embodiments of the present disclosure, a method, as implemented by an interactive computing system configured with specific computer-executable instructions, can include generating a proxy representation of a set of private data enabling a user to determine characteristics of the set of private data without accessing the set of private data. The method may further include accessing a first data set including a set of private data that is accessible by the interactive computing system, but that is not accessible to a user. The method may further include receiving a characteristics pool that specifies a set of characteristics associated with at least some data included in the set of private data. Further, the method may include determining a first set of characteristics of the first data set. The first set of characteristics may be determined based at least in part on content of the first data set and the set of characteristics included in the characteristics pool. The method may further include accessing a data library including public data that is accessible to the user. The method may further include determining from the data library a second data set based at least in part on the first set of characteristics. The second data set may include a proxy representation of the first data set. The second data set may be associated with a second set of characteristics that have at least a threshold degree of similarity to the first set of characteristics. The method may further include outputting the second data set for presentation to the user enabling the user to access the proxy representation of the first data set in place of accessing the first data set.

In various embodiments, the first data set may include an identity of a plurality of fixed income components.

In various embodiments, the first set of characteristics may include one or more indications of a first set of risk factors. The second set of characteristics may include one or more indications of a second set of risk factors.

In various embodiments, the first set of characteristics and the second set of characteristics may include an indication of one or more of a developed market currency risk, an emerging market currency risk, an emerging market interest rate risk, a developed market interest rate risk, a sovereign credit risk, a prepayment credit risk, a breakeven credit risk, a municipal credit risk, an inflation breakeven credit risk, an emerging market external credit risk, a mortgage-backed securities credit risk, an asset-backed securities credit risk, a high yield corporate credit risk, or an investment grade credit risk.

In various embodiments, the method may include determining a variance indicator. The variance indicator may indicate a variance between the first set of characteristics and the second set of characteristics.

In various embodiments, the method may include obtaining a bid ask spread based at least in part on the variance indicator.

In various embodiments, the method may include, based at least in part on the variance indicator, determining a precision rate for the second set of characteristics. The precision rate may correspond to a rate of precision of the second set of characteristics in predicting a behavior of the first data set. The method may further include determining that the precision rate is within a threshold range. Outputting the second data set for presentation to the user may be based at least in part on determining that the precision rate is within the threshold range.

In various embodiments, the first set of characteristics may include at least one characteristic included in the second set of characteristics.

In various embodiments, the second set of characteristics may include an identity of one or more liquid instruments.

In various embodiments, the first set of characteristics may indicate a volatility of a return of the first data set.

In various embodiments, each characteristic of the second set of characteristics may be associated with a weight. A particular weight may indicate an exposure of the first data set to a particular characteristic of the second set of characteristics.

In various embodiments, a return associated with the first set of characteristics may correspond to a return associated with the second set of characteristics.

According to various embodiments of the present disclosure, a system can include a data store storing computer executable instructions and one or more computing devices. The one or more computing devices may be configured to access a first data set including s set of private data that is accessible by the one or more computing devices, but that is not accessible to a user. The one or more computing devices may further be configured to receive a characteristics pool that specifies a set of characteristics associated with at least some data included in the set of private data. The one or more computing devices may further be configured to determine a first set of characteristics of the first data set. The first set of characteristics may be determined based at least in part on content of the first data set and the set of characteristics included in the characteristics pool. The one or more computing devices may further be configured to access a data library including public data that is accessible to the user. The one or more computing devices may further be configured to determine from the data library a second data set based at least in part on the first set of characteristics. The second data set may include a proxy representation of the first data set. The second data set may be associated with a second set of characteristics that have at least a threshold degree of similarity to the first set of characteristics. The one or more computing devices may further be configured to output the second data set for presentation to the user enabling the user to access the proxy representation of the first data set in place of accessing the first data set.

In various embodiments, the first data set may include an identity of a plurality of fixed income components.

In various embodiments, the first set of characteristics and the second set of characteristics may include an indication of one or more of a developed market currency risk, an emerging market currency risk, an emerging market interest rate risk, a developed market interest rate risk, a sovereign credit risk, a prepayment credit risk, a breakeven credit risk, a municipal credit risk, an inflation breakeven credit risk, an emerging market external credit risk, a mortgage-backed securities credit risk, an asset-backed securities credit risk, a high yield corporate credit risk, or an investment grade credit risk.

In various embodiments, the one or more computing devices may further be configured to determine a variance indicator. The variance indicator may indicate a variance between the first set of characteristics and the second set of characteristics. The one or more computing devices may further be configured to, based at least in part on the variance indicator, determine a precision rate between the second set of characteristics and the first set of characteristics. The precision rate may indicate a precision between the first set of characteristics and the second set of characteristics. The one or more computing devices may further be configured to determine that the precision rate is within a threshold range. Outputting the second data set for presentation to the user may be based at least in part on determining that the precision rate is within the threshold range.

According to various embodiments of the present disclosure, a computer-implemented method, as implemented by an interactive computing system configured with specific computer-executable instructions, can include generating a proxy representation of a set of fixed income assets enabling a user to determine risk characteristics of the set of fixed income assets without accessing the set of fixed income assets. The method may further include accessing private fund data associated with a private fund including a set of fixed income assets. The private fund data may be accessible by the interactive computing system and not accessible to a user. The method may further include receiving a risk factor pool that specifies a set of risk factors associated with at least some fixed income assets of the private fund. The method may further include determining a first set of risk factors associated with the private fund based at least in part on the private fund data and the set of risk factors included in the risk factor pool. The method may further include accessing a fixed income library including a set of fixed income assets. The fixed income library may be accessible to the user. The method may further include determining from the fixed income library a proxy representation of the private fund based at least in part on the first set of risk factors. The proxy representation of the private fund may include an identity of one or more fixed income assets of the fixed income library. A second set of risk factors associated with the proxy representation of the private fund may have at least a threshold degree of similarity to the first set of risk factors. The method may further include output the proxy representation of the private fund to the user enabling the user to determine a risk level of the private fund without having access to the private fund data.

In various embodiments, the first set of risk factors and the second set of risk factors may include an identity of one or more of a developed market currency risk, an emerging market currency risk, an emerging market interest rate risk, a developed market interest rate risk, a sovereign credit risk, a prepayment credit risk, a breakeven credit risk, a municipal credit risk, an inflation breakeven credit risk, an emerging market external credit risk, a mortgage-backed securities credit risk, an asset-backed securities credit risk, a high yield corporate credit risk, or an investment grade credit risk.

In various embodiments, each risk factor of the second set of risk factors may be associated with a weight. A particular weight may indicate an exposure of the private fund to a particular risk factor of the second set of risk factors.

In various embodiments, the first set of risk factors may include at least one risk factor included in the second set of risk factors.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 3 depicts an example private data set according to some embodiments.

FIG. 4 depicts characteristics associated with the example private data set of FIG. 3 according to some embodiments.

DETAILED DESCRIPTION

Overview

Figure 1:
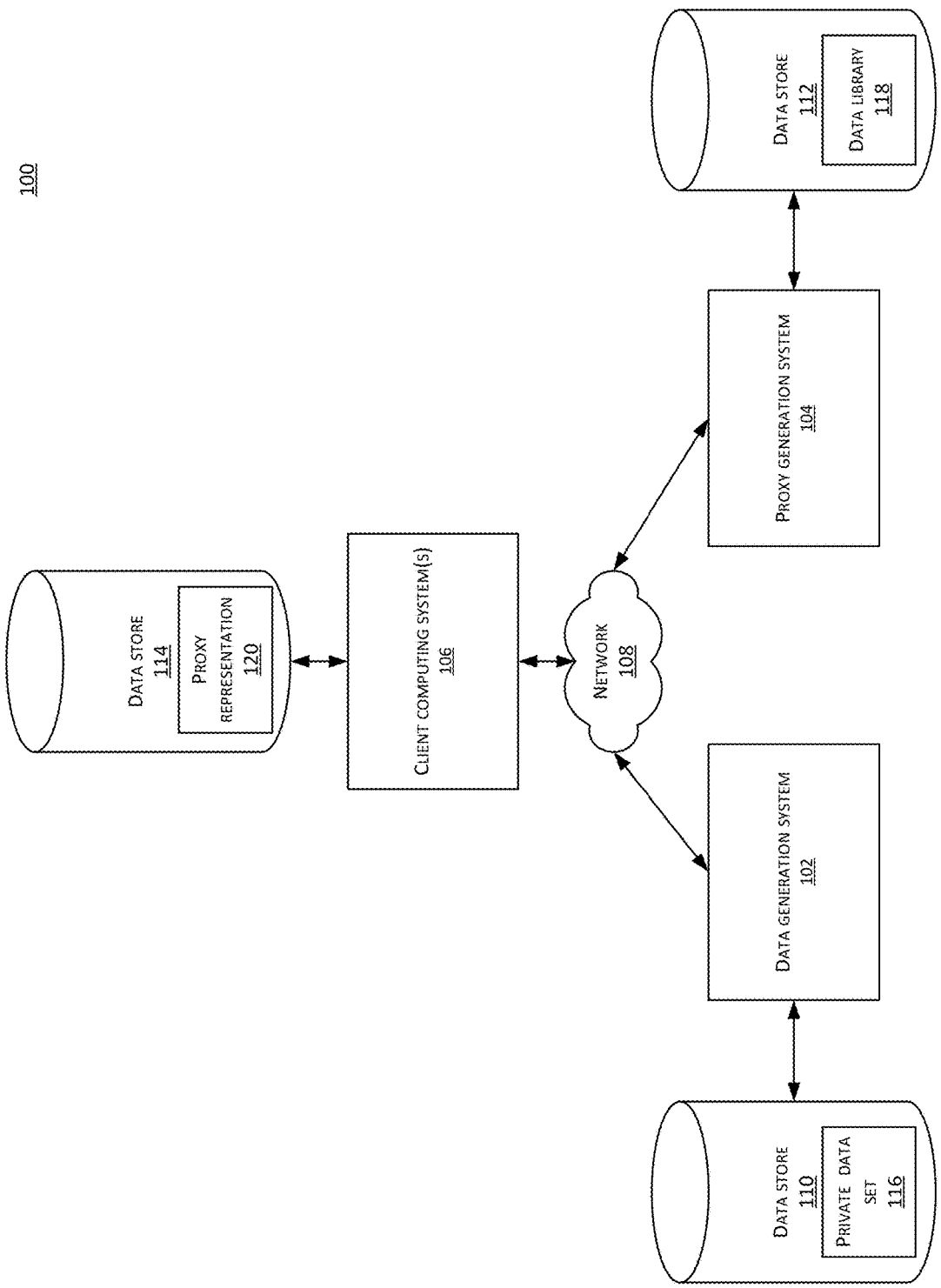
FIG. 1 depicts a schematic diagram of an example proxy generation system according to some embodiments.

The present disclosure generally relates to managing a private data set. Generally described, a private data set may include data that a data owner (e.g., an entity, authorized representative of the entity (e.g., authorized employee or administrator), or user that authored, owns, manages, or is permitted to access the data) does not desire to share with another entity. For example, the private data set may include proprietary data, private data, or data that is not otherwise publicly available. The private data set may include a plurality of data identified based at least in part on a shared private nature of the data. The private data set may include private data at a first time. In some embodiments, the data owner may disclose the private data set at a second time, which may be later than the first time. At the second time, the private date may be disclosed to one or more individuals or organizations that are external to an entity or organization that owns, authors, or otherwise controls the private data. Further, the private data set may include a plurality of private data items. For example, the private data set may include information about multiple users, groups, activities, entities, inanimate objects, etc. and a private data item may include information about a specific user, group, activity, entity, inanimate object, etc. For instance, the private data set may include information associated with an exchange-traded fund ("ETF") (e.g., a fixed income ETF) and each private data item of the private data set may include information associated with a particular fixed income asset. Further, the private data set may include information associated with a collection of securities that are traded on a security exchange and each private data item of the private data set may include information associated with a particular asset or security. The private data set may also include information, which may also be private, about the quantities and/or weights associated with each private data item. For example, the proportion of the collection of securities corresponding to a particular security may be private information included within the private data set. Therefore, the private data set may include private data items that collectively share a private status.

Further, the collection of private data items of the private data set may correspond to various characteristics of the private data set. For example, each private data item may correspond to a sub-characteristic or a set of sub-characteristics and the private data set may correspond to a characteristic or a set of characteristics that are based at least in part on the sub-characteristics of the private data items. Further, the characteristics may indicate one or more features of, or associated with, the private data set. For example, the characteristics may indicate a risk, a volatility, etc. associated with the private data set. Further, where each private data item is associated with a particular risk, volatility, etc., the private data set is associated with a risk, volatility, etc. based on the risk, volatility, etc. of each private data item. The sub-characteristics associated with a particular private data item may correspond to a weight such that the weight of the private data item with regards to the private data set is adjustable. For example, the private data set may correspond to a group of users and may include information about the group such as social security numbers, telephone numbers, registered vehicles, income, etc. Each private data item (e.g., corresponding to a particular user) may correspond to characteristics that indicate a locale of the user that corresponds to the private data item (e.g., South Carolina, California, Massachusetts, etc.). The private data set may further correspond to characteristics that indicate a locale of the groups of users associated with the private data set (e.g., North America). The characteristics and/or the sub-characteristics corresponding to a private data set may be private information that is accessible for certain entities and prohibited for other entities.

As noted above, the private data set and the characteristics associated with the private data set may include private data that is inaccessible by certain entities. Further, the private data set may include data that is public for certain entities and private for other entities. For example, the private data set may be public data for particular entities ("permitted entities") (e.g., entities may include computing devices, users, identifiers, groups, etc.) and private data for other entities ("prohibited entities") (e.g., entities may include computing devices, users, identifiers, groups, etc.). The permitted entities and the prohibited entities may be delineated based on the role of the specific entities (e.g., management, supervisors, engineering, accounting, employees, executives, human resources, legal counsel, clients, customers, contractors, etc.). For example, the private data set may be public data for an accounting group and a management group and private data for a contractor group and a human resources group. In order to determine the entities that may access the private data set, the private data set may correspond to a restricted list (sometimes referred to as a "blacklist") or a permitted list (sometimes referred to as a "whitelist") that indicates entities that cannot (or can) access the private data set. The delineation of the prohibited entities and the permitted entities with regards to a particular private data set may further be based on the content of the private data set.

As noted above, the private data set may be inaccessible to certain prohibited entities. However, as the prohibited entities may be incapable of accessing the private data set, the data owner (e.g., user or set of users that manage the data) may desire to provide certain information associated with the private data set to the prohibited entities. For example, the data owner may provide the information associated with the private data set to the prohibited entities for compliance purposes. The information provided by the data owner may correspond to the characteristics. For example, the data owner may provide the characteristics associated with a private data set to prohibited entities in order for the prohibited entities to estimate additional information associated with the private data set. Further, where the private data set corresponds to a group of users and the characteristics corresponds to a location of the group of users, the prohibited entities may use the characteristics to estimate the location of a new user added to the private data set. However, it may be disadvantageous for the data owner to provide information associated with the private data set as the characteristics of the private data set may enable the reverse engineering of the private data set or the characteristics may be proprietary.

In certain implementations, a system may receive a request to access a private data set from a prohibited entity. Based on the status of the prohibited entity, the system may not provide access to the private data set or characteristics associated with the private data set. Therefore, the system may not provide access to the private data set for the prohibited entity. Instead, the prohibited entity is denied access to the private data set, characteristics associated with the private data set, or other information associated with the private data set. Denying access to such information may be disadvantageous as the prohibited entity may be unable to make certain determinations without access to the information associated with the private data set. Additionally, in other implementations, a system may provide access to a depiction of the private data set for the prohibited entity. Further, the data holder may desire to provide access to a set of data similar to the private data set for the prohibited entity in order to provide a set of data similar to the private data set without providing access to the private data set. For example, where the private data set is associated with a group of fixed income assets, it is desirable to provide a data set similar to the group of fixed income assets. However, such a depiction may be disadvantageous as the similarities between the private data set and the depiction may result in the data owner providing unnecessary and unwanted information to the prohibited entity.

In certain implementations, a system may receive a request to access a private data set from a prohibited entity with a limited set of permissions (e.g., a limited access entity). Based on the limited set of permissions, the system may provide access to a first portion of the private data set and provide a depiction of a second portion of the private data set to the limited access entity. Therefore, the system may not provide full access to the private data set for the limited access entity. Instead, by providing a depiction of the second portion of the private data set, the system is able to retain a base level of privacy with respect to the private data set and the limited access entity. Providing limited access to the private data set may provide an unsatisfactory experience for certain data owners as the limited access entity is provided access, albeit limited access, to the private data set which may be undesired due to the nature of a private data set. Further, limiting access to the private data set may provide an unsatisfactory experience for limited access entities as the limited access entity is not provided access to the entire private data set which may provide insufficient information for the limited access entity to make a decision. Further, in the case of semi-transparent ETFs, entities are provided access to a first subset of the information associated with the semi-transparent ETF (e.g., 80% of the semi-transparent ETF) and denied access to a second subset of the information associated with the semi-transparent ETF (e.g., 20% of the semi-transparent ETF). In order to allow the limited access entity to obtain information associated with the second subset of information, the limited access entity is further provided access to a depiction of the second subset of information. As noted above, providing limited access to information associated with the semi-transparent ETF may be disadvantageous for the limited access entity and the data owner. Therefore, it may be advantageous to provide information associated with the private data set to the limited access entity or to the prohibited entity without providing access to the private data set.

Some aspects of this disclosure address the problems noted above, among others, by determining a proxy representation (e.g., a translation, a risk translation, a reflection, a refraction, a restatement, a rendering, etc.) of a private data set. For example, the proxy representation may be a descriptive translation of the characteristics of a private data set. The proxy representation may include a translation of the private data set and may not include and/or provide access to information associated with the private data set. Further, the data included in the private data set may be associated with a particular set of characteristics or metadata. For example, the characteristics of the private data set may include risk factors associated with the private data set (e.g., a credit risk, a currency risk, an interest rate risk, or any other risk). Further, the characteristics of the private data set may identify a volatility of the private data set (e.g., a measure of deviation or variation over time). The characteristics of the private data set may further identify a dependability, an uncertainty, a complexity, a uniformity, a size, or any other characteristics of the private data set. The proxy representation may be associated with characteristics (e.g., proxy characteristics) similar to the characteristics associated with the private data set. For example, the system may select a proxy representation of the private data set that is associated with characteristics that are the same as the characteristics associated with the private data set or characteristics within a threshold difference of the characteristics associated with the private data set. The proxy representation may be a multi-layered proxy representation. For example, the proxy representation may include a first layer of translation as the system may determine one or more characteristics that represent the private data set. Further, the proxy representation may include a second layer of translation as the system may determine characteristics that are associated with the determined characteristics of the private data set. The multi-layered proxy representation may enable the system to provide access to the proxy representation that is multiple layers of abstraction from the private data set and prevent the reverse engineering of the private data set based on the proxy representation. Further, prohibited entities that are unauthorized to access the private data set may use the characteristics of the proxy representation to make determinations, decisions, etc. associated with the private data set. As the characteristics of the proxy representation share at least a base similarity with characteristics associated with the private data set, the prohibited entity may make these determinations on a performance basis while unable to access the private data set. It will be understood that the base similarity may be any similarity range (e.g., 75% to 95% or 60%-80%, etc.).

For example, the private data set may include information associated with a natural perfume (e.g., a naturally occurring perfume made from natural ingredients). The system can abstract the natural perfume to determine characteristics of the perfume (e.g., elements or smell characteristics of the perfume). This may represent a first level of abstraction. In some embodiments, a user may not be able to replicate the natural perfume based on the characteristics of the perfume. Further, the system can generate a proxy representation (e.g., the characteristics of the public data set) of the characteristics of the perfume. The proxy representation may include elements or smell characteristics of a synthetic perfume (e.g., a non-naturally occurring perfume) that is similar to the natural perfume (e.g., that produces a smell with a threshold range of similarity). This may represent a second level of abstraction. In some embodiments, a user may not be able to replicate the characteristics of the natural perfume from the characteristics of the synthetic perfume. Therefore, the system can provide the proxy representation for the natural perfume without revealing the natural perfume and/or the characteristics of the natural perfume. Instead, the dual abstraction of the natural perfume and the characteristics of the natural perfume, enables the system to maintain the proprietary nature of the natural perfume while providing a proxy representation of the characteristics of the natural perfume.

In order to generate the proxy representation, the data owner may provide, or cause to be provided, the private data set to a proxy generation system. As noted above, the private data set may correspond to a set of characteristics. In order to generate a proxy representation of the private data set, the proxy generation system may select one or more characteristics from the set of characteristics to represent the set of characteristics. For example, where the private data set is information associated with a semi-transparent ETF, the set of characteristics may include risk factors such as a credit risk, a currency risk, an interest rate risk, or any other risk. Further, the set of characteristics may include one or more of a developed market currency risk, an emerging market currency risk, an emerging market interest rate risk, a developed market interest rate risk, a sovereign credit risk, a prepayment credit risk, a breakeven credit risk, a municipal credit risk, an inflation breakeven credit risk, an emerging market external credit risk, a mortgage-backed securities credit risk, an asset-backed securities credit risk, a high yield corporate credit risk, or an investment grade credit risk. The proxy generation system may further determine that one or more risk factors (e.g., the credit risk) represent the characteristics associated with the private data set. As discussed above, by determining risk factors representing characteristics associated with the private data set, the proxy generation system may generate a first level of abstraction or translation from the private data set to the proxy representation. In some embodiments, each characteristic of the set of characteristics may correspond to a private data item of the private data set. In other embodiments, each characteristic of the set of characteristics may correspond to each private data item of the private data set. Further, each characteristic of the set of characteristics may correspond to a weight representing the influence of the particular characteristic for the private data set.

Further aspects of this disclosure relate to the proxy generation system accessing a public data library and determining a proxy group of characteristics (e.g., a second group of characteristics). The public data library may correspond to data that is publicly available. The proxy generation system may access the public data library in order to determine a proxy group of characteristics sharing similarities with the first group of characteristics. Further, the proxy generation system may determine that the first group of characteristics and the proxy group of characteristics share at least a certain level of similarity. The proxy generation system may determine that the first group of characteristics and the proxy group of characteristics are to be substantially similar based on certain factors (e.g., an amount of holdings, type of exposure, performance, tracking error, etc.). For example, the proxy generation system may determine that the level of similarity satisfies a certain level or range of similarity (e.g., between 80% and 90% similarity, between 85% to 95% similarity, or any other degree of similarity that can give a user a degree of knowledge of the holdings included or to be included in an ETF or other fund without revealing the actual or entire contents of the ETF or fund). In some embodiments, it may not be desirable to provide a proxy group of characteristics that is 100% similar to the first group of characteristics. In some embodiments, the first group of characteristics and the proxy group of characteristics may include one or more of the same characteristics. As discussed above, by determining characteristics associated with a public data set and having a particular desired similarity to the characteristics associated with the private data set, the proxy generation system may generate a second level of abstraction or translation from the private data set to the proxy representation. Based on the determined proxy group of characteristics, the proxy generation system may provide the proxy group of characteristics to the prohibited entity. In some embodiments, the proxy generation system may provide a proxy representation (e.g., a second data set) associated with the proxy group of characteristics to the prohibited entity that has the proxy group of characteristics. For example, proxy generation system may determine the proxy representation by determining a group of data that is associated with the proxy group of characteristics. In other embodiments, the proxy generation system may determine a proxy representation of the private data set. The proxy generation system may determine that the proxy representation and the private data set share particular similarities (e.g., characteristics). Based on the proxy representation, the proxy generation system may determine the proxy group of characteristics by parsing the characteristics associated with the proxy representation.

In light of the description above, it will be understood that the embodiments disclosed herein substantially increase data security. Specifically, the embodiments disclosed herein enable a system to generate a proxy representation of a private set of data and a set of characteristics of the proxy representation that shares similarities with the characteristics associated with the private set of data. The proxy representation of the private set of data may correspond to characteristics that have a certain threshold similarity to the characteristics associated with the private set of data. The ability to provision a proxy representation of the private set of data based on the characteristics associated with the private set of data enables the data owner to avoid providing direct access to the private set of data or the associated set of characteristics. Further, by ensuring that the characteristics of the proxy representation are within a particular range of similarity to the characteristics of the private set of data, the data holder can avoid enabling the reverse engineering (e.g., illicitly or otherwise obtaining) of the characteristics and the private set of data, thereby ensuring that the private set of data and the associated characteristics remain private. Specifically, the characteristics of the proxy representation can provide a prohibited entity with information associated with the private set of data without providing access to the private set of data or the associated characteristics. With regards to a private data set associated with exchange-traded funds, such a proxy representation and characteristics associated with an exchange-traded fund prevents a prohibited entity from front running the fund. Thus, the presently disclosed embodiments represent an improvement in the functioning and security of private data, both electronic data and physical data. By improving the functioning and security of private sets of data, Internet/network communications and other communications are improved. Moreover, the presently disclosed embodiments address technical problems inherent within the communication of private data; specifically, how to provide information associated with a private data set without providing access to the private data set or the particular characteristics associated with the private data set. These technical problems are addressed by the various technical solutions described herein, including the inclusion of computer-executable instructions within a proxy generation system that enables the generation of a proxy representation and characteristics associated with the proxy representation based on a private data set. Thus, the present application represents a substantial improvement on existing data security in general.

Various aspects of the disclosure will now be described with regard to certain examples and embodiments, which are intended to illustrate but not limit the disclosure. As explained above, generating a proxy representation and characteristics of a private data set may be applied in different contexts. To simplify discussion and not to limit the present disclosure, the following discussion revolves around determining a proxy representation of a group of fixed income assets. However, one skilled in the art will appreciate that the techniques disclosed herein may be applied to any number of other contexts and/or with other investment vehicles, such as private data sets associated with groups of users, organizations, or other entities.

Example Environment Including a Proxy Generation System

FIG. 1 illustrates an example environment 100 in which a proxy generation system 104 is implemented according to some embodiments, enabling the generation of a proxy representation 120 of a private data set 116 and provision of the proxy representation 120 to a client. The example environment 100 includes a data generation system 102, a proxy generation system 104, and one or more client computing systems 106 that are each connected and/or communicating over a network 108. In some embodiments, more or less systems are included in the example environment 100. For example, the example environment 100 may include multiple proxy generation systems 104. Further, one or more of the data generation system 102, the proxy generation system 104, and the client computing system 106 may be the same system. For example, one system may perform multiple functions such as determination of characteristics associated with the private data set 116 of the data generation system 102 and generation of the proxy representation 120 of the proxy generation system 104. Further, a system may implement one or more of the data generation system 102, the proxy generation system 104, and the client computing system 106 may be the same system. For example, a system may implement both the data generation system 102 and the proxy generation system 104. The data generation system 102, the proxy generation system 104, and the client computing system 106 refer to computing devices or systems that compute, assemble, store, correlate, or otherwise process information. The data generation system 102, the proxy generation system 104, and/or the client computing system 106 can include, but are not limited to, a personal computer, a server computer, a laptop device, a multiprocessor system, a microprocessor based system, a network PC, a minicomputer, a mainframe computer, or a distributed computing environment that includes any of the above systems or the like.

Each of the data generation system 102, the proxy generation system 104, and the client computing system 106 includes, is connected to, or is in communication with a respective data store 110, 112, and 114. Each data store 110, 112, 114 maintains and/or may access data associated with the proxy representation 120. For example, data store 110 stores a private data set 116 corresponding to a proxy representation 120. Further, data store 112 stores a data library 118. The data library 118 may include a set of publically available data. Further, data store 114 stores a proxy representation 120 generated by the proxy generation system 104. The proxy representation 120 may correspond to the private data set 116 and the data library 118. Each data store 110, 112, and 114 may store corresponding information, such as the proxy representation 120, as a set of local variables. As shown in FIG. 1, the data generation system 102 maintains and/or may access a data store 110, the proxy generation system 104 maintains and/or may access a data store 112, and the client computing system 106 maintains and/or may access a data store 114. In some embodiments, one or more of the data stores 110, 112, or 114 may be the same data store. For example, one data store may store the private data set 116, the data library 118, and the proxy representation 120. Further, the data generation system 102, the proxy generation system 104, and the client computing system 106 may each maintain and/or access one or more data stores (e.g., a data store storing the private data set 116, the data library 118, and the proxy representation 120). Each of the data generation system 102, the proxy generation system 104, and the client computing system 106 may be in communication with a respective data store 110, 112, and 114. In some embodiments, each of the data generation system 102, the proxy generation system 104, and the client computing system 106 communicates with a respective data store 110, 112, and 114 through the network 108.

Elements of the example environment 100 including one or more of the data generation system 102, the proxy generation system 104, and the client computing system 106 or the data stores 110, 112, and 114 can be implemented at a network computing service or cloud provider network (sometimes referred to simply as a "cloud"). The cloud provider network may include a pool of network-accessible computing resources (such as compute, storage, and networking resources, applications, and services), which may be virtualized or bare-metal. The cloud can provide on-demand network access to a shared pool of configurable computing resources that can be programmatically provisioned and released in response to commands. These resources can be dynamically provisioned and reconfigured to adjust to variable load.

The network 108 can include the Internet, an intranet network, a cellular communication network, a wide area network ("WAN"), a local area network ("LAN"), a personal area network ("PAN"), a wireless local area network ("WLAN"), or other networks. In some implementations, each of the data generation system 102, the proxy generation system 104, and the client computing system 106 communicates with a subset of the data generation system 102, the proxy generation system 104, and the client computing system 106. For example, the data generation system 102 may communicate with the proxy generation system 104 and the client computing system 106 may communicate with the proxy generation system 104.

The data generation system 102 may obtain a private data set 116 from a data store 110. The data generation system 102 may automatically access the private data set in response to a command to generate a proxy representation of 120 of data stored at the data store 110. In some cases, a user (e.g., a data owner) may identify the private data set 116 to the data generation system 102. In some embodiments, the data owner or other user may prompt the data generation system 102 to generate a private data set 116 based on particular, private data items. For example, the data owner may indicate a plurality of private data items associated with stocks, bonds, etc. that are each also associated with a particular weight and/or quantity and the data generation system 102 may generate and/or determine a private data set associated with the ETF that holds or includes the stocks, bonds, etc. In other embodiments, the data generation system 102 may obtain the private data set 116. For example, the data owner (e.g., a fund manager) may provide the private data set 116 to the data generation system 102. The private data set 116 may be private in that the private data items that make up the private data set 116 may be private or otherwise not disclosed to prohibited entities or are not publically disclosed. In some cases, the user that authorizes generation of the proxy representation 120 of the private data set 116 may not have access or may not be able to view the private data set 116. Further, the private data set 116 may be private in that the specific combination of private data items is not disclosed to prohibited entities or is not publically disclosed. For example, where the private data set 116 is associated with an ETF, the private data items that are associated with the stocks, bonds, etc. that are included in the ETF and the specific combination of private data items may not be publically disclosed. In some cases, the private data may eventually be disclosed, but is not yet disclosed. For example, although the contents of an ETF may eventually be public, it may be desirable to not publically disclose the components of the ETF without sufficient delay to prevent free-riding or front-running by another investor or speculation by investors prior to the public release of the ETF or prior to the ETF going on sale. In some cases, it is important to prevent or reduce speculation on funds included in the ETF as the speculation can cause pricing changes that negatively affect the pricing of the ETF.

Based on obtaining the private data set 116, the data generation system 102 may determine characteristics that are associated with the private data set 116. The data holder may provide the characteristics to the data generation system 102 with or separate from the private data set 116. For example, the characteristics may be part of the private data set. In some embodiments, the data generation system 102 may analyze the private data set 116 to determine the characteristics associated with the private data set 116. Further, the data generation system 102 may parse the private data set 116 to determine characteristics of the private data set 116. In some embodiments, the data generation system 102 may first determine characteristics of private data items of the private data set 116 and subsequently determine characteristics of the private data set 116. The data generation system 102 may group the private data set 116 in order to determine characteristics associated with the private data set. For example, where the private data set 116 corresponds to a group of users, the data generation system 102 may parse the private data set 116 based on the information included within the private data set 116 (e.g., age, location, gender, marital status, employment status) to determine the characteristics associated with the private data set 116. For example, where each user of a group of users associated with a private data set 116 is between 17 and 49 years old, a characteristic of the private data set 116 may be age: 17-49.

As noted above, the data generation system 102 may determine characteristics associated with the private data set 116. In some embodiments, the private data set 116 is associated with a group of stocks, bonds, etc. and the characteristics may correspond to risk factors associated with the group of stocks, bonds, etc. For example, the data generation system 102 may determine risk factors associated with the private data set 116 such as a credit risk factor, a currency risk factor, an interest rate risk factor, or other risk factors. Further, the set of characteristics may include one or more of a developed market currency risk, an emerging market currency risk, an emerging market interest rate risk, a developed market interest rate risk, a sovereign credit risk, a prepayment credit risk, a breakeven credit risk, a municipal credit risk, an inflation breakeven credit risk, an emerging market external credit risk, a mortgage-backed securities credit risk, an asset-backed securities credit risk, a high yield corporate credit risk, or an investment grade credit risk. The credit risk factor (e.g., spread risk) may correspond to the risk premium associated with investing in non-Treasury securities. Further, the credit risk factor may correspond to a default risk present in corporate bonds. In some embodiments, the credit risk factor may correspond to one or more of a sovereign risk factor, a prepayment risk factor, a breakeven risk factor, etc. The currency risk factor may correspond to risk associated with emerging market or unhedged global portfolios. Further, the currency risk factor may correspond to potential volatility as corresponding exchange rates fluctuate. The interest rate risk factor (e.g., the duration risk) may correspond to changes in risk free (e.g., Treasury) rates. Further, the interest rate risk factor may be a primary drive of overall price volatility for certain data sets (e.g., high quality bonds). Each stock, bond, etc. associated with the private data set 116 may correspond to a particular range with regards to a particular risk factor (e.g., a range of credit risks), a characteristic of the private data set 116 may correspond to the same range for the risk factor. Therefore, the data generation system 102 may determine characteristics associated with the private data set 116.

As noted above, the data generation system 102 may generate or otherwise obtain a private data set 116 and determine characteristics that are associated with or represent the private data set 116. In order to generate a proxy representation 120 (e.g., a translation of the characteristics) of the private data set 116, the proxy generation system 104 may receive the private data set 116 and characteristics associated with the private data set 116. In order to determine the proxy representation 120, the proxy generation system 104 may compare the characteristics of the private data set 116 with characteristics located in a data library 118. In some embodiments, the proxy generation system 104 may derive particular characteristics from the data library 118 based on exposures of the private data set 116 to systemic characteristics. Each exposure to a characteristic (e.g., interest rate risk, credit rate risk, currency risk) may correspond to a potential return and/or volatility. Each characteristic may be imperfectly correlated and the contribution to the overall return and/or volatility of the private data set 116 may be more, less, or different than the individual return and/or volatility of a particular characteristic. The exposure to the characteristics may comprise a variety of calculations (e.g., key rate durations, convexities, gamma and vega sensitivities, and notional exposures). The data library 118 may include one or more algorithms for particular data sets (e.g., bonds, structured products, derivatives currencies and commodities). Therefore, the proxy generation system 104 may compare the characteristics of the private data set 116 with characteristics located in the data library 118.

In some embodiments, the proxy generation system 104 may compare the private data set 116 with the data located in the data library 118 to determine the proxy representation 120. The data library 118 may include data associated with one or more liquid instruments. The proxy generation system 104 may communicate with a plurality of data libraries 118 and each data library may correspond to different types or groupings of private data. For example, a first data library may correspond to private user data, a second data library may correspond to private fund data, a third data library may correspond to private organization data. The data libraries 118 may be delineated based on any one or more types or groups. The proxy generation system 104 may analyze the private data set 116 and select a data library based on the private data set 116. For example, the proxy generation system 104 may determine that the private data set 116 is associated with private fund data and select a data library 118 that includes public fund data.

The proxy generation system 104 may parse the data library 118 to determine components of the data library 118 that have characteristics similar to the characteristics of the private data set 116 (e.g., in order to determine a financial equivalent by replicating the risk from the private data set 116). The proxy generation system 104 may compare the characteristics of the private data set 116 with the characteristics of groupings of components of the data library 118 to determine a particular grouping of components of the data library 118 that shares the same or similar characteristics with the private data set 116. The particular grouping of components, or the proxy representation 120, may include one or more components of the data library 118 having characteristics similar to the characteristics of the private data set 116. The proxy generation system 104 may determine the proxy representation 120 such that the characteristics of the proxy representation 120 and the characteristics of the private data set 116 have a certain range of similarities. For example, the characteristics of the proxy representation 120 and the characteristics of the private data set 116 may be 80% to 90% similar. It will be understood that the characteristics of the proxy representation 120 and the characteristics of the private data set 116 may have other range of similarities, such as 75%, 85%, 85% to 95%, etc., similarity. By ensuring that the similarities of the characteristics of the proxy representation 120 and the characteristics of the private data set 116 are within a certain range, the proxy generation system 104 can ensure that the characteristics of the proxy representation 120 are an accurate representation of the characteristics of the private data set 116 without providing a proxy representation 120 that has characteristics explicitly matching the characteristics of the private data set 116. In some embodiments, the characteristics of the private data set 116 may include one or more of the same characteristics as the proxy representation 120. After generating the proxy representation 120, the proxy generation system 104 may store the proxy representation 120 in an associated data store 112. Therefore, the proxy generation system 104 may use the private data set 116 and the data library 118 to generate the proxy representation 120.

As noted above, the proxy generation system 104 may generate the proxy representation 120 and the associated characteristics. Further, the proxy generation system 104 may provide the proxy representation 120 and/or the characteristics of the proxy representation 120 to the client computing system 106. Further, the client computing system 106 may store the proxy representation 120 and/or the characteristics of the proxy representation 120 in a local data store 114. The client computing system 106 may provide the proxy representation 120 and/or the characteristics of the proxy representation 120 to a user of the client computing system 106. The user of the client computing system 106 may use the proxy representation 120 and/or the characteristics of the proxy representation 120 in order to make decisions with regards to the private data set 116. For example, where the private data set 116 is information associated with an ETF, the user of the client computing system 106 may use the characteristics of the proxy representation in order to make a decision with regards to purchasing and/or selling stocks, bonds, funds, etc. Further, the proxy representation 120 and/or the characteristics of the proxy representation 120 allow the user to replicate the private data set 116 on a performance basis without having actual access to the private data set 116. By replicating the private data set 116 on a performance basis, the user receives a proxy representation 120 associated with characteristics that indicate a likely future behavior of the private data set 116 (e.g., a return) without providing access to the private data set 116. Therefore, the client computing system 106 may receive the proxy representation 120 and/or the characteristics of the proxy representation 120 and provide the proxy representation 120 and/or the characteristics of the proxy representation 120 for use by a user of the client computing system 106.

Example Proxy Generation System

Figure 2:
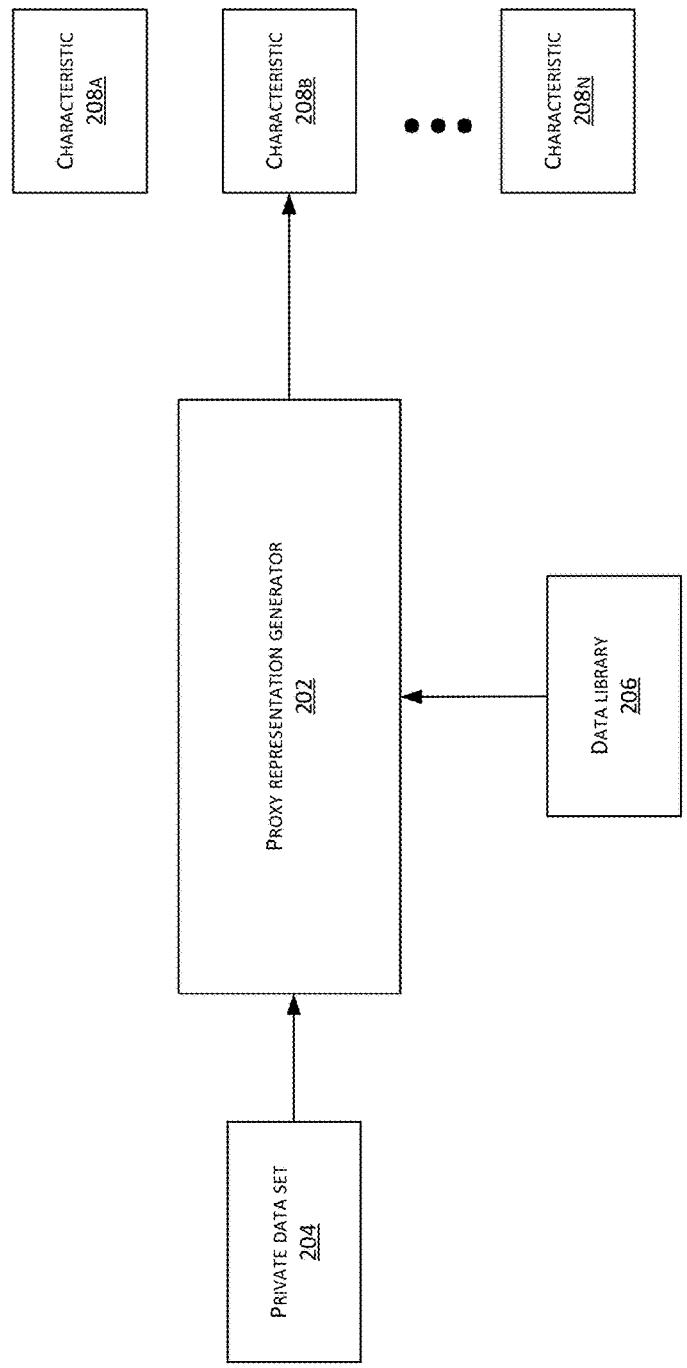
FIG. 2 depicts an example workflow for establishing characteristics in an example proxy generation system.

FIG. 2 depicts a schematic diagram of a proxy generation system 200 configured to determine one or more characteristics associated with a proxy representation of a particular private data set 204. The proxy generation system 200 may include one or more of the embodiments described with respect to the proxy generation system 104. The proxy generation system 200 may include a proxy representation generator 202. The proxy representation generator 202 may obtain a private data set 204, characteristics associated with the private data set 204, and a data library (e.g., the data library 118 or 206). The private data set 204 may include or may be the private data set 116. The proxy representation generator 202 may use the private data set 204, the characteristics and the data library 206 to generate one or more characteristics 208A, 208B, . . . , and 208N associated with a proxy representation of the private data set 204. The one or more characteristics 208A, 208B, . . . , and 208N may be referred to herein in the singular or the plural as characteristics 208. The proxy representation generator 202 may use the characteristics 208 to represent the characteristics of the private data set 204 such that the private data set 204 remains private.

The proxy representation generator 202 may determine the proxy representation in order to provide a proxy representation of a secured, private data set 204 for unsecured provision. The proxy representation generator 202 and/or the proxy generation system 200 may be referred to a commodity risk model, a global risk model, a risk monitor, or a risk management system in some implementations. In order to determine the proxy representation of the private data set 204, the proxy representation generator 202 may obtain characteristics associated with a given private data set 204. The proxy representation generator 202 may obtain the characteristics from another system, such as the data generation system 102 of FIG. 1, or determine the characteristics by parsing the private data set 204. The proxy representation generator 202 may determine, from the characteristics associated with the private data set 204, a subset of the characteristics. For example, the proxy representation generator 202 may determine five or less characteristics that represent the private data set 204. The proxy representation generator 202 may further determine that the subset of characteristics correspond to the full set of characteristics of the private data set 204 within a particular accuracy threshold or range. For example, the proxy representation generator 202 may select three characteristics associated with the private data set 204 such that the three characteristics predict a volatility of a return of the private data set 204 with substantial similarity to the full set of characteristics (e.g., within an 80% to 90%, or 85% to 95% accuracy as compared with the full set of characteristics). Further, the proxy representation generator 202 may identify characteristics that have a particular explanatory power for the private data set 204 (e.g., the characteristics with the highest explanatory power for the private data set 204). The characteristics identified by the proxy representation generator may include characteristics ranked by a corresponding explanatory power for the characteristics for the overall private data set 204. In some cases, the degree of similarity achieved or desired may vary based on the size of the private data. In some embodiments, the particular accuracy threshold or range associated with a set of characteristics may be based on input provided by a third party, volatility in markets, and/or an ability of the subset of characteristics to sustainably capture the full set of characteristics. Although the examples above mention three or five characteristics, it should be understood that the subset of characteristics may include any other number of characteristics, including additional or different characteristics. Moreover, in some cases, the entire set of characteristics may be used to determine a proxy representation of the private data set 204.

The characteristics may be a measure of parameters associated with the private data set 204. For example, where the private data set 204 is associated with an ETF, the characteristics of the private data set 204 may include a portfolio risk, benchmark error, value-at-risk statistics, risk contributions, volatility, expected shortfall, structuration risks, liquidity, tracking error volatility, associated fees, previous performance, net asset value, total and estimated cash, intraday indicative value, shares outstanding, accrued dividends, or any other information associated with an ETF. Further, the characteristics may include risk factors that indicate a potential volatility associated with the private data set 204 (e.g., a potential variance associated with a future return of the private data set 204). For example, where the private data set 204 is associated with a group of users and each user corresponds to a private data item, each private data item may correspond to characteristics such as a social security number, a physical address, a driver's license number, marital status, etc. Further, the private data set may correspond to characteristics related to the private data items such as a range of social security numbers, a location, etc. Further, the characteristics may also include private data. The characteristics may be private (e.g., a particular address) and/or the combination of characteristics may be private in that while a particular characteristic may be public (e.g., the particular address), the specific combination of characteristics is private (e.g., the particular address and an associated name).

For example, the private data set 204 may be information associated with a group of ETFs. In providing the characteristics of the proxy representation, the proxy representation generator 202 may provide a quantification of return volatility associated with a particular group of ETFs. The return volatility may represent an estimate of the volatility associated with the particular group. The return volatility may further correspond to a plurality of characteristics (e.g., risk factors). For example, the plurality of characteristics may include one or more of interest rate duration, credit spread duration, or equity beta. In order to determine the characteristics that are associated with a private data set 204, the proxy representation generator 202 may determine an exposure of a private data set 204 relative to a particular characteristic. The exposure may be based at least in part on one or more data libraries stored by the proxy representation generator 202. Each of the characteristics may indicate a potential return associated with the group of ETFs and a volatility associated with the particular return. The proxy representation generator 202 can calculate each volatility in order to generate an overall return volatility that is associated with the particular group of ETFs. In some embodiments, the amount that a particular characteristic factors into the overall return volatility may be based on the size of the particular characteristic relative to the size of the other characteristics. For example, where the interest rate duration for a group of ETFs is larger than the credit spread duration, the correlation between the interest rate duration and the overall return volatility may be larger than the correlation between the credit spread duration and the overall return volatility. In other embodiments, each characteristic is associated with the same weight.

As noted above, in order to generate the proxy representation, the proxy representation generator 202 may query a data library 206 in order to obtain a set of characteristics 208. The data library 206 may correspond to global sets of data such that the proxy representation generator 202 covers multiple asset classes, derivatives, geographical exposures, and/or other categories of data. The data library 206 may further correspond to a public data set. In some embodiments, the data library 206 may be publicly available knowledge. In other embodiments, the data library 206 may be partially available to the public. For example, the data library 206 may not be available to each member of the public and may be available to a subset of the public. Further, the data library 206 may be publicly available to a portion of the public and the private data set 204 may be available to a subset of that portion. The data library 206 may further include proxy characteristics associated with the public data set. For example, the data library 206 may correspond to proxy characteristics associated with the public data set such as risk factors corresponding to public funds associated with the public data set. Further, where the public data set corresponds to a collection of securities, the proxy characteristics may correspond to publicly available risk factors associated with the public data set such as a currency risk factor, a credit rate risk factor, an interest rate risk factor, etc. Therefore, the proxy representation generator 202 may obtain a data library 206 that corresponds to publicly available information.

The proxy representation generator 202 may parse the data library 206 to determine characteristics 208 associated with a proxy representation of the private data set 204. The proxy representation of the private data set 204 may identify a financial equivalent of the private data set 204. Further, the proxy representation generator 202 may determine a number of characteristics 208 associated with the proxy representation of the private data set 204. For example, the proxy representation generator 202 may determine more than, less than, or equal to a certain number of characteristics 208 associated with the proxy representation. Further, the proxy representation generator may determine characteristics 208 that are within a certain level of similarity (e.g., a range of similarity, a threshold level of similarity, a target similarity, a recommended similarity) to the characteristics of the private data set 204. For example, the proxy representation generator 202 may require the characteristics 208 and the characteristics of the private data set 204 have at least 95% similarity. In some embodiments, the proxy representation generator 202 may not require that the characteristics 208 and the characteristics of the private data set 204 satisfy a certain level of similarities. Based on the determined characteristics 208, the proxy representation generator 202 may determine a proxy representation (e.g., a public data set) associated with the characteristics 208. In some embodiments, the proxy representation generator 202 may determine characteristics 208 based at least in part on an already determined proxy representation. Therefore, the proxy representation generator 202 may generate the proxy representation.

For example, the proxy representation generator may then determine characteristics 208 of the proxy representation that are associated with the characteristics of the private data set 204. The overall return volatility of the characteristics 208 may correspond to the overall return volatility of the characteristics of the private data set 204. By providing the characteristics 208 and/or the proxy representation to the third party, the third party can determine how to adjust the group of ETFs to adjust in order to modify the overall return volatility. The third party may therefore modify an expected return and a risk associated with the group of ETFs.

The proxy representation generator 202 may include multiple components in order to determine the characteristics associated with the private data set 204 and the characteristics 208 of the proxy representation. For example, the proxy representation generator 202 may include a first system that determines characteristics associated with the private data set 204 and a second system that determines the characteristics 208. In some embodiments, the proxy representation generator 202 may include one system that determines the characteristics associated with the private data set 204 and determines the characteristics 208. In other embodiments, the proxy representation generator 202 receives the characteristics associated with the private data set 204. Further, the proxy representation generator 202 may not obtain the private data set 204 and may only receive the characteristics associated with the private data set 204.

As noted above, the proxy representation generator 202 may determine the characteristics 208 of the proxy representation. A third party may obtain the characteristics 208 in order for the third party to predict future behavior of the private data set 204 (e.g., a return of the private data set 204, a future action of the private data set 204, etc.).

Example Private Data Set

FIGS. 3-6 illustrate example use cases with respect to a non-limiting example implementation of a process of generating a proxy representation of a private data set with characteristics similar to the characteristics associated with a private data set. For example, the proxy representation of the private data set with characteristics may be determined using one or more of the embodiments described in the document "Semi-Transparent Fixed Income ETFs: PIMCO's Proposed Methodology," which is attached as Appendix A, and which is hereby incorporated by reference in its entirety for all purposes. A third party that is unauthorized to access the private data set may obtain the proxy representation and/or the characteristics of the proxy representation. Specifically, with regards to FIGS. 3-6, the private data set corresponds to information associated with an ETF (e.g., an active fixed-income ETF) and the characteristics correspond to information associated with risk factors of the ETF. It will be understood that in other implementations the private data set and the associated characteristics may correspond to other types of data. For example, the private data set and the characteristics may be users and traits associated with the users, groups and traits associated with the groups, or any other set of private data.

As illustrated in FIG. 3, a system, such as the proxy generation system 104, may obtain a private data set 300 at step 1. In other words, the proxy generation system 104 obtains a private data set 300 that is considered private with respect to at least one entity, group, person, computing device, etc. The private data set 300 may be any set of data that retains at least some privacy. Further, the private data set 300 may correspond to a larger data set. For example, as seen in FIG. 3, the original data set may include 978 holdings (or components) and the private data set 300 may include a subset of the original data set or in the example of FIG. 3, 27 holdings. In other embodiments, the private data set 300 may include the same components as the original data set. The private data set 300 may correspond to an ETF and the holdings may correspond to ETF holdings. For example, the private data set 300 may correspond to a bond ETF and the holdings may correspond to bond ETF holdings. The private data set 300 may include one or more components (e.g., securities) each representing a given percentage or number of the net assets. The components may correspond to one or more types of securities. In the example of FIG. 3, the private data set 300 is associated with security types: Mortgage Pass Thru, Government, Repo, Corporate, and Interest Rate Swap-Receiver and each security type may include multiple particular securities. Thus, the private data set 300 may include one or more components or holdings that are considered private or proprietary.

As noted above, the private data set 300 includes a set of private components. Further, in some embodiments, the proxy generation system 104 may generate the private data set 300. The proxy generation system 104 may generate the private data set 300 by parsing the larger data set for a particular number of holdings that represent the larger data set. For example, the proxy generation system 104 may determine that 27 holdings represent the larger data set that corresponds to 100 holdings and the 27 holdings may correspond to the private data set 300. In some embodiments, the private data set may include more, less, or different holdings. For example, the proxy generation system 104 may determine that 1, 3, 15, or 100 holdings represents the private data set. In some embodiments, another system, a third party, etc. may provide the private data set 300 to the proxy generation system 104. For example, the data generation system of FIG. 1 may provide the private data set 300 to the proxy generation system 104. The proxy generation system 104 may therefore obtain the private data set 300.

Further, the private data set 300 may correspond to a level of similarity indicating correspondence between the private data set 300 and the larger set of data. The proxy generation system 104 (or another system) may select the private data set 300 such that the level of similarity (e.g., a tracking error) is within a certain range (e.g., 85% to 95%). The level of similarity may correspond to a particular number or range of basis points (a basis point may refer to a unit of measure e.g., the difference between an actual return and an estimated return). The basis points may further indicate a level of error between the return corresponding to the private data set 300 and the larger set of data. The basis points may further correspond to a daily average of the difference (in basis points) between the return for the private data set and a larger data set.

Example Characteristics of the Example Private Data Set

As illustrated in FIG. 4, a system, such as the proxy generation system 104, may determine one or more characteristics 400 associated with the private data set 300 at step 2. The proxy generation system 104 may generate the characteristics 400 based at least in part on the private data set 300. In some embodiments, the proxy generation system 104 may not generate the one or more characteristics 400 and may obtain the one or more characteristics 400. For example, the proxy generation system 104 may receive the characteristics 400 from the data generation system as seen in FIG. 1. The proxy generation system 104 may determine the characteristics 400 based on the private data set 300 including one or more of the particular securities, the types of securities, or the percentage of the private data set corresponding to particular securities. Therefore, the proxy generation system 104 may determine one or more characteristics 400 associated with the private data set 300.

The one or more characteristics 400 may correspond to one or more risk factors. For example, the one or more characteristics 400 may correspond to one or more bond risk factors. Further, the one or more characteristics 400 may correspond to one or more of a credit risk factor, an interest rate risk factor, or a currency risk factor. In some embodiments, the one or more characteristics 400 may correspond to more or less risk factors. Each characteristic 400 may correspond to a particular risk factor. For example, in FIG. 4, the private data set is represented by the risk factors: High Yield Credit Default Swap Index ("HY CDX"), Agency Mortgage-Backed Security ("MBS") Spread, Investment Grade Credit Default Swap Index ("IG CDX"), and United States ("US") Duration. Each risk factor may further correspond to an explanatory rating (e.g., an R squared). The explanatory rating may indicate the likelihood that the given risk factor explains the future behavior of the private data set. The one or more risk factors may be based at least in part on the explanatory rating. In the example of FIG. 4, risk factor HY CDX has an explanatory rating of 0.80, Agency MBS Spread has an explanatory rating of 0.75, IG CDX has an explanatory rating of 0.70, and US Duration has an explanatory rating of 0.55. The explanatory rating may correspond to any numerical rating, symbolical rating, alphabetical rating, alphanumeric rating, or any other rating. For example, the explanatory rating may correspond to a numerical rating between 0 and 1 representing the likelihood that the particular risk factor is able to predict future behavior of the private data set.

Based at least in part on the individual risk factors and the corresponding explanatory ratings, the proxy generation system 104 may determine a set of risk factors to represent the private data set 300. The proxy generation system 104 may select the set of risk factors from a larger set of risk factors that correspond to the private data set 300. Further, the proxy generation system 104 may select the set of risk factors such that the explanatory rating of the characteristics 400 falls within a certain threshold range (e.g., between 0.85 and 0.95). The set of risk factors may further correspond to a tracking error. The proxy representations system may calculate the tracking error over time (e.g., daily, weekly, monthly, etc.). The tracking error may be based on previous predictions associated with one or more characteristics of the characteristics 400. In some embodiments, the tracking error may be based on the set of explanatory ratings corresponding to the more characteristics 400. Therefore, the characteristics 400 may be based on the private data set 300 in order to generate a proxy representation of the one or more characteristics 400. The proxy generation system 104 may generate the proxy representation in order to replicate the risk of the private data set 300 across different data streams (e.g., across a private data stream and a public data stream.

Figure 5:
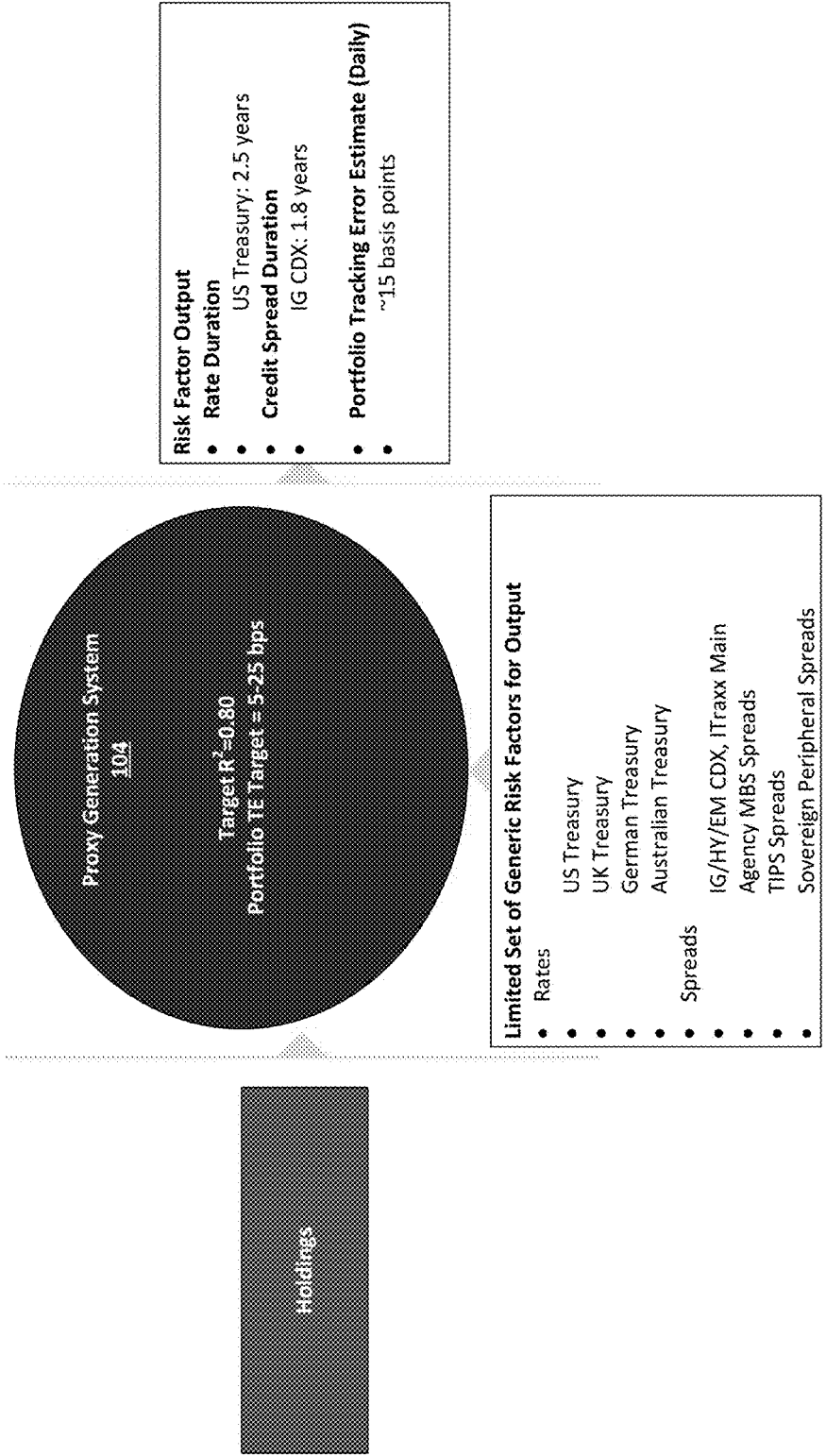
FIG. 5 depicts a flowchart of one non-limiting example embodiment of a proxy representation process in accordance with certain embodiments of the present disclosure.

Example Generation of a Proxy Representation Based on Characteristics of Private Data Set As further illustrated in FIG. 5, the proxy generation system 104 may determine a proxy representation of the private data set and characteristics of the proxy representation at step 3. The proxy generation system 104 may receive a list of holdings corresponding to the ETF. The holdings may correspond to a subset of the holdings that make up the ETF. In some embodiments, the holdings may include each holding in the ETF. Further, the proxy generation system 104 may receive the holdings and parse the holdings to select one or more holdings as noted above. In some embodiments, the proxy generation system 104 may receive one or more risk factors associated with the holdings. In other embodiments, the proxy generation system 104 may determine risk factors associated with the particular holdings. Thus the proxy generation system 104 may determine a set of holdings and risk factors associated with the holdings.

In order to generate a proxy representation of the private data set that shares similar characteristics, the proxy generation system 104 may obtain a data library corresponding to a limited set of generic risk factors for output. In some embodiments, the data library may correspond to a public data set. The generic risk factors may correspond to multiple types of risk factors. For example, the generic risk factors may include one or more of a currency risk factor, a credit risk factor, or an interest rate risk factor. Further, the generic risk factors may include multiple risk factors for each risk factor. For example, as seen in FIG. 4, the interest rate risk factor includes the US treasury risk factor, the United Kingdom ("UK") treasury risk factor, the German treasury risk factor, and the Australian treasury risk factor and the credit risk factor includes the Investment Grade ("IG")/High Yield ("HY")/Emerging Market ("EM")/Credit Default Swap Index ("CDX"), iTraxx Main credit risk factors, the Agency MBS Spreads, the Treasury Inflation Protection Securities ("TIPS") Spreads, and the Sovereign Peripheral Spreads. In some embodiments, particular risk factors may correspond to particular regions (e.g., countries). Further, the generic risk factors may include one risk factor for a particular region. In other embodiments, the generic risk factors may include multiple risk factors for a particular region.

The generic risk factors may be classified into various classes. For example, the generic risk factors may be classified as rates, breakeven rates, peripheral rates, credit corporations, credit EMs, credit mortgage agencies, etc. The generic risk factors may include one or more of a treasury rate 10 year Australian dollar, a treasury rate 10 year British pound sterling, a treasury rate 5 year United States dollar, a treasury rate 10 year United States dollar, a treasury rate 10 year euro, a breakeven rate 10 year United States dollar, a treasury spread 10 year France, an IG credit spread 5 year CDX, an IG European credit spread 5 year iTraxx Main, a HY credit spread 5 year CDX, an EM credit spread 5 year CDX, an Agency MBS, etc. Therefore, the generic risk factors may identify a proxy market instrument. For example, the proxy market instruments may include a 10 year Australian future, a 10 year United Kingdom future, a 5 year United States future, a 10 year United States future, a 10 year Germany future, a 10 year United States TIPS hedged with 10 year treasury futures, a 10 year France futures hedged with 10 year Germany futures, an on-the-run ("OTR") CDX IG, an OTR iTraxx Europe Main, an OTR CDX HY, an OTR CDX EM, a to be announced production coupon hedged with 5 year US treasury futures, etc. It will be understood that the data library may include more or less risk factors and may include more or less types of risk factors. Therefore, the proxy generation system 104 may obtain a data library of generic risk factors.

In order to generate an accurate proxy representation, the proxy generation system 104 may obtain one or more of an explanatory rating (e.g., a variance indicator) or a target tracking error. The explanatory rating may indicate a target level of variance between the risk factors associated with the holdings and the proxy representation. For example, as seen in FIG. 4, the target level of variance may be 0.20, indicating that the target similarity of the proxy representation is 80% similar to the characteristics of the private data. It should be understood that other target levels or variance are possible, such as 0.90 or 0.95. In some embodiments, the explanatory rating may correspond to a range such as 75% to 85% or 60% to 90%. The proxy generation system 104 may also obtain a tracking error target. The target tracking error may indicate a range of error when predicting future behavior of the holdings based on the proxy representation. For example, the tracking error (e.g., precision rate) may indicate that when determining a return of the holdings based on the proxy representation, one can expect a tracking error of 10 basis points. In the example of FIG. 4, the tracking error is between 5 and 25 basis points. The proxy generation system 104 may target a particular target similarity (e.g., 80%) and a particular target tracking error (e.g., 30 basis points) when viewing the proxy representation in aggregate. Further, the proxy generation system 104 may permit a lower target similarity (e.g., <60%) if the proxy generation system 104 determines a lower tracking error estimate (e.g., 15 basis points). Further, the similarity estimate may affect the target tracking error and/or the tracking error estimate may affect the target similarity. For example, the proxy generation system 104 may permit a lower target similarity based on determining that the tracking error estimate is lower than a particular threshold. Further, the proxy generation system 104 may require a higher target similarity based on determining that the tracking error estimate is higher than a particular threshold. The proxy generation system may determine a target tracking error based on a similarity estimate and/or may determine a target similarity based on a tracking error estimate. Therefore, the proxy generation system 104 may use the explanatory rating and the tracking error target to determine the proxy representation.

Based at least in part on the risk associated with the holdings and the generic risk factors, the proxy generation system 104 may determine a proxy representation of the characteristics. The proxy generation system 104 may determine risk factors from the list of generic risk factors that are similar to the risk factors associated with the risk factors associated with the holdings. In some embodiments, the proxy generation system 104 determines a certain number of generic risk factors to include in the characteristics of the proxy representation. For example, the proxy generation system 104 may limit the amount of generic risk factors for inclusion in the characteristics of the proxy representation to no more than five. In some embodiments, the proxy generation system 104 may determine a number of risk factors within a particular range of risk factors (e.g., between two and five risk factors). Further, the number of risk factors may be selected from and including at least n types of risk factors where n can be any number (e.g., where n is 2, the risk factor types may include at least a currency risk factor and a credit risk factor). The proxy generation system 104 may further determine that the particular generic risk factors satisfy the explanatory rating and the tracking error target provided to the proxy generation system 104. Further, the proxy generation system 104 may determine the minimum number of risk factors needed to satisfy the explanatory rating and/or the tracking error targets. The proxy generation system 104 may optimize the risk factors to determine an optimal set of risk factors for particular holdings. A user or client associated with the system 104 who does not have access to the holdings can obtain the generic risk factor as a risk factor output. In the example of FIG. 5, the risk factor output includes the US treasury interest rate risk factor and the IG CDX credit risk factor with a daily tracking error estimate of approximately 15 basis points. Therefore, the risk factor output represents characteristics of a proxy representation of the holdings.

Example Proxy Representation and Associated Weights

Figure 6:
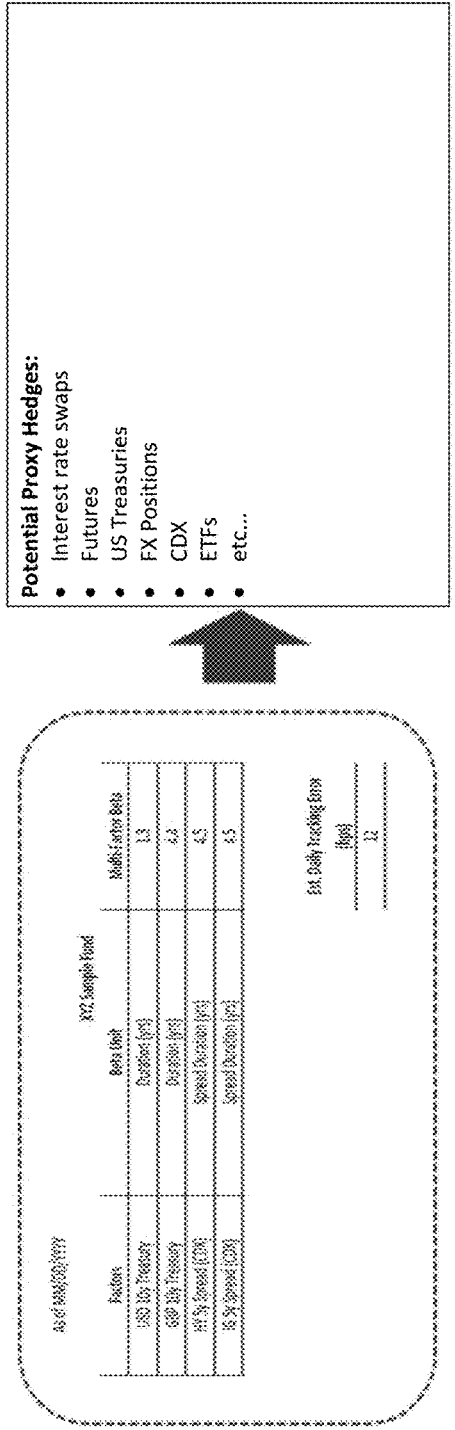
FIG. 6 depicts an example proxy representation according to some embodiments.

As further illustrated in FIG. 6, a system, such as the proxy generation system 104, may provide the proxy representations 600 and corresponding characteristics to a third party, client, user, etc. at step 4. The characteristics of the proxy representation 600 may include a set of risk factors and corresponding weights. FIG. 6 represents a series of proxy representations 600 generated by the proxy generation system 104 over a given period of time with regards to a non-limiting example of a particular fund, the XYZ Sample Fund. For example, the XYZ Sample Fund may correspond to the Australia Income Fund. It will be understood that the proxy representations 600 may be generated with respect to any fund, including any fixed income fund or other fund types. Moreover, as previously explained, embodiments disclosed herein can be applied to any types of private and proxy data and is not limited to investment funds. The section labeled "XYZ Sample Fund" indicates various risk factors of the XYZ Sample Fund and associated betas. These risk factors can be generic risk factors for a particular period of time. Further, the risk factors are each associated with a given beta (e.g., a weight) and a given beta unit for the respective period of time. The particular weight indicates the weight that corresponds to the risk factor as compared to the other risk factors. In the example of FIG. 6, the risk factors are "United States Dollar 10 y Treasury," "British Pound Sterling 10 y Treasury," "High Yield Five Year Spread (Credit Default Swap Index)," and "Investment Grade Five Year Spread (Credit Default Swap Index)," which are associated with beta units "Duration (years)," "Duration (years)," "Spread Duration (years)," and "Spread Duration (years)," and Multi-Factor Betas "1.3," "4.4," "4.5," and "4.5." Each given time period may further correspond to a particular volatility, a tracking error, and an explanatory rating. The volatility may indicate a particular volatility associated with the fund at each time period. The volatility may further indicate the extent to which the particular fund's net asset value typically fluctuates. The volatility may further correspond to the risk such that a higher risk may correspond to a higher volatility and a lower risk may correspond to a lower volatility. The tracking error may indicate the error associated with the fund at a particular time period and the explanatory rating may indicate a correlation between the proxy representation and the fund. In the example of FIG. 6, the tracking error is 12 basis points. The proxy representation 600 may further correspond to a potential proxy hedge. For example, the proxy representation 600 may identify a proxy (e.g., a tradable instrument proxy) such as one or more of interest rate swaps, futures, United States Treasuries (e.g., OTR treasury bonds), Foreign Exchange positions, Credit Default Swap Index, Exchange Traded Funds, etc. Therefore, the proxy representation 600 and/or the corresponding characteristics may be provided to a client or user to enable decisions to be made by the client or user on a performance basis.

Generation of the Proxy Representation

Figure 7:
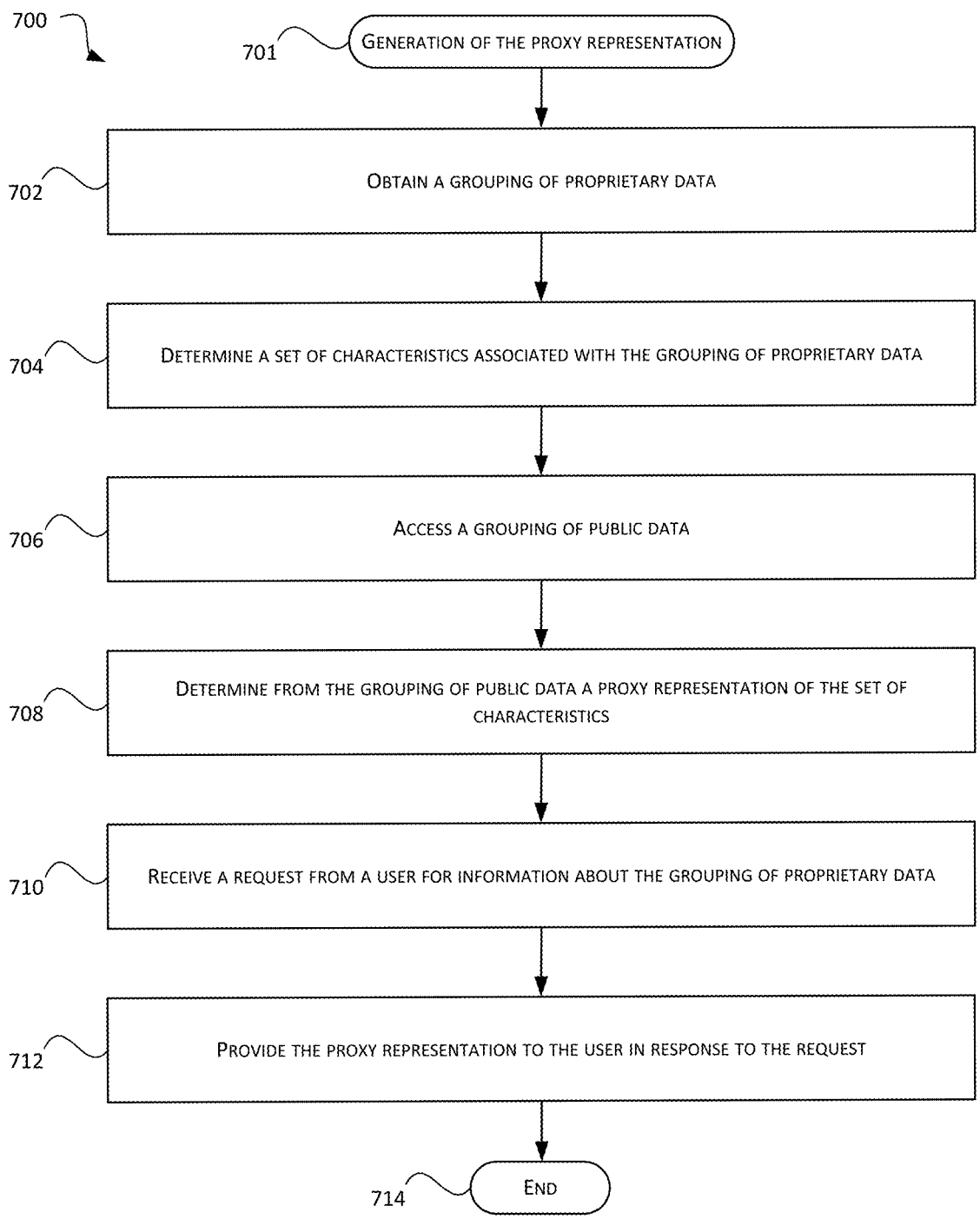
FIG. 7 is a flowchart of an example routine for generating a proxy representation of a first data set.

FIG. 7 presents a flowchart of an embodiment of a proxy generation process 700 in accordance with certain aspects of the present disclosure. The process 700 includes determining a set of characteristics associated with a private data set and generating a proxy representation with similar characteristics. By using such a proxy representation, a third party is not provided access to the private data and is only provided access to the proxy representation and/or the characteristics of the proxy representation. The process 700 can be implemented by any system that can generate a proxy representation of a private data set. The process 700, in whole or in part, can be implemented by, for example, a data generation system 102, a proxy generation system 104, a client computing system 106, a proxy generation system 200, a proxy representation generator 202, among others. Although any number of systems, in whole or in part, can implement the process 700, to simplify discussion the process 700 will be described with respect to particular systems.

The process 700 may begin upon a proxy generation system 104 receiving or obtaining a grouping of proprietary data at the block 702. The process 700 may begin automatically, in response to a user interaction with a user interface, and/or upon receiving the grouping of proprietary data. For example, the proxy generation system 104 may periodically receive a grouping of proprietary data (e.g., daily, weekly, monthly, etc.). The proxy generation system 104 may receive the grouping of proprietary data in order to generate a proxy representation for the grouping of proprietary data. The grouping of proprietary data may include proprietary data that is not shared with at least a subset of potential recipients. For example, the grouping of proprietary data may include private data such as bank account statements, credit card statements, tax documents, trade secrets, or any other data that a user or entity desires to maintain some level of privacy. The proxy generation system 104 may manage the grouping of proprietary data. For example, the proxy generation system 104 may be a record keeper to manage proprietary data for systems. The process 700 may be embodied in a set of executable program instructions stored on a computer-readable medium, such as one or more disk drives, of the proxy generation system 104. When the process 700 is initiated, the executable program instructions can be loaded into memory, such as random access memory ("RAM"), and executed by one or more processors of the proxy generation system 104.

In some embodiments, the proxy generation system 104 may generate the grouping of proprietary data. The grouping of proprietary data may correspond to an exchange traded fund including multiple bonds. Therefore, the proxy generation system 104 may obtain the grouping of proprietary data including private information.

At block 704, the proxy generation system 104 determines a set of characteristics associated with the grouping of proprietary data. The set of characteristics may correspond to one or more traits, features, or other data associated with the grouping of proprietary data. For example, where the grouping of proprietary data corresponds to an exchange traded fund, the set of characteristics may correspond to risk factors. The proxy generation system 104 may determine the characteristics by comparing the grouping of proprietary data with a template. For example, the template may identify particular data to extract from the grouping of proprietary data. In some embodiments, the proxy generation system 104 may build characteristics of the grouping of proprietary data based on analyzing the grouping of proprietary data. For example, the proxy generation system 104 may analyze the grouping of proprietary data and determine a level of risk, volatility, uniformity, predictability, etc. associated with the grouping of proprietary data (e.g., based on a comparison with other data). The proxy generation system 104 may dynamically monitor the grouping of proprietary data (e.g., by monitoring how assets associated with the grouping of proprietary data perform) and generate the characteristics based on the dynamic monitoring. Further, the proxy generation system 104 may extract the characteristics from metadata associated with or included with the grouping of proprietary data. In some cases, the characteristics may be obtained by accessing a specified set of metadata and/or by performing a set of calculations on the provided proprietary data. For example, the proprietary data may be applied to a set of models, such as machine learning models to determine risk profiles bonds or securities associated with the proprietary data. In some embodiments, the grouping of proprietary data may be the characteristics. In other embodiments, a user, via a user computing device, may identify a manner of identifying the characteristics and the proxy generation system 104 may identify the characteristics based on the manner of identifying the characteristics. Therefore, the proxy generation system 104 may determine characteristics associated with the grouping of proprietary data.

At block 706, the proxy generation system 104 accesses a grouping of public data. The public data may correspond to a public data library including publicly available information. For example, the grouping of public data may include data that is public to at least a plurality of users, accounts, etc. The grouping of public data may be available or public for at least one user, account, etc. for which the grouping of proprietary data is not available or not public. A particular account may have authorization to access the grouping of public data and may not have authorization to access the grouping of proprietary data. For example, the grouping of proprietary data may be encrypted data that is encrypted using an encryption key and the grouping of public may be unencrypted data. The grouping of public data may include data associated with a public traded fund. Further, the grouping of public data may include individual holdings of the public traded fund. The grouping of public data may include or be associated with a set of characteristics corresponding to one or more traits, features, or other data associated with the grouping of public data. For example, the characteristics may identify risk factors of the grouping of public data. Further, the proxy set of characteristics may correspond to the set of characteristics associated with the private data set. In some embodiments, the grouping of public data may include the proxy set of characteristics. In other embodiments, the proxy set of characteristics may be characteristics of the grouping of public data (e.g., risk factors associated with a public traded fund). The grouping of public data may correspond to a proxy representation of the grouping of proprietary data.

At block 708, the proxy generation system 104 determines from the grouping of public data a proxy representation of the set of characteristics associated with the grouping of proprietary data (e.g., generates a translation of the characteristics to a set of characteristics associated with the grouping of public data). In order to determine the proxy representation, the proxy generation system 104 may determine one or more characteristics of the grouping of public data that share similarities to the set of characteristics of the grouping of proprietary data. The proxy generation system 104 may determine the proxy representation based on an ability of the characteristics of the grouping of public data to track the performance of the characteristics of the grouping of private data. For example, the proxy representation may be based at least in part on one or more of a tracking error, a volatility, or an explanatory rating of the set of characteristics of the grouping of proprietary data. As the set of characteristics corresponds to publicly available data, it may be advantageous to provide the set of characteristics to a third party in lieu of the proprietary information. Therefore, the proxy generation system 104 may determine from the grouping of public data the proxy representation of the set of characteristics.

At block 710, the proxy generation system 104 receives a request from a user for information about the grouping of proprietary data. For example, the proxy generation system 104 may receive a request from a user or client for information about an exchange traded fund in order to base decisions about the fund. The proxy generation system 104 may determine that the user and/or an account associated with the user is not authorized to access the grouping of proprietary data. Based on determining that the user is not authorized to access the grouping of proprietary data, the proxy generation system 104 may not provide access to the grouping of proprietary data. Therefore, the proxy generation system 104 receives a request for information about the grouping of proprietary data.

At block 712, the proxy generation system 104 provides the proxy representation (e.g., the set of proxy characteristics) to the user in response to the request. The proxy generation system 104 may receive the request and determine that a proxy representation has been generated for the private data set. Based on this determination, the proxy generation system 104 may provide the generated proxy representation in lieu of providing access to the grouping of proprietary data. In the event that a proxy representation has not been generated for the private data set, the proxy generation system 104 may generate the proxy representation. In some embodiments, the proxy generation system 104 may determine that a proxy representation has not been generated for the private data set and deny the request.

The characteristics of the proxy representation may be a series of characteristics and a series of corresponding weights. For example, where the private data set is an exchange traded fund and the characteristics of the private data set are a series of risk factors and corresponding weights, the proxy representation may also be a fund and the characteristics of the proxy representation may be a series of risk factors and corresponding weights. Based on receiving the proxy representation, the proxy generation system 104 may generate an indicative net asset value associated with the private data set based on the proxy representation. Further, based on the proxy representation and one or more of the tracking error, the volatility, or the explanatory rating, the proxy generation system 104 may generate a bid ask spread for the private data set. Therefore, the proxy representation is provided to the user.

Figure 8:
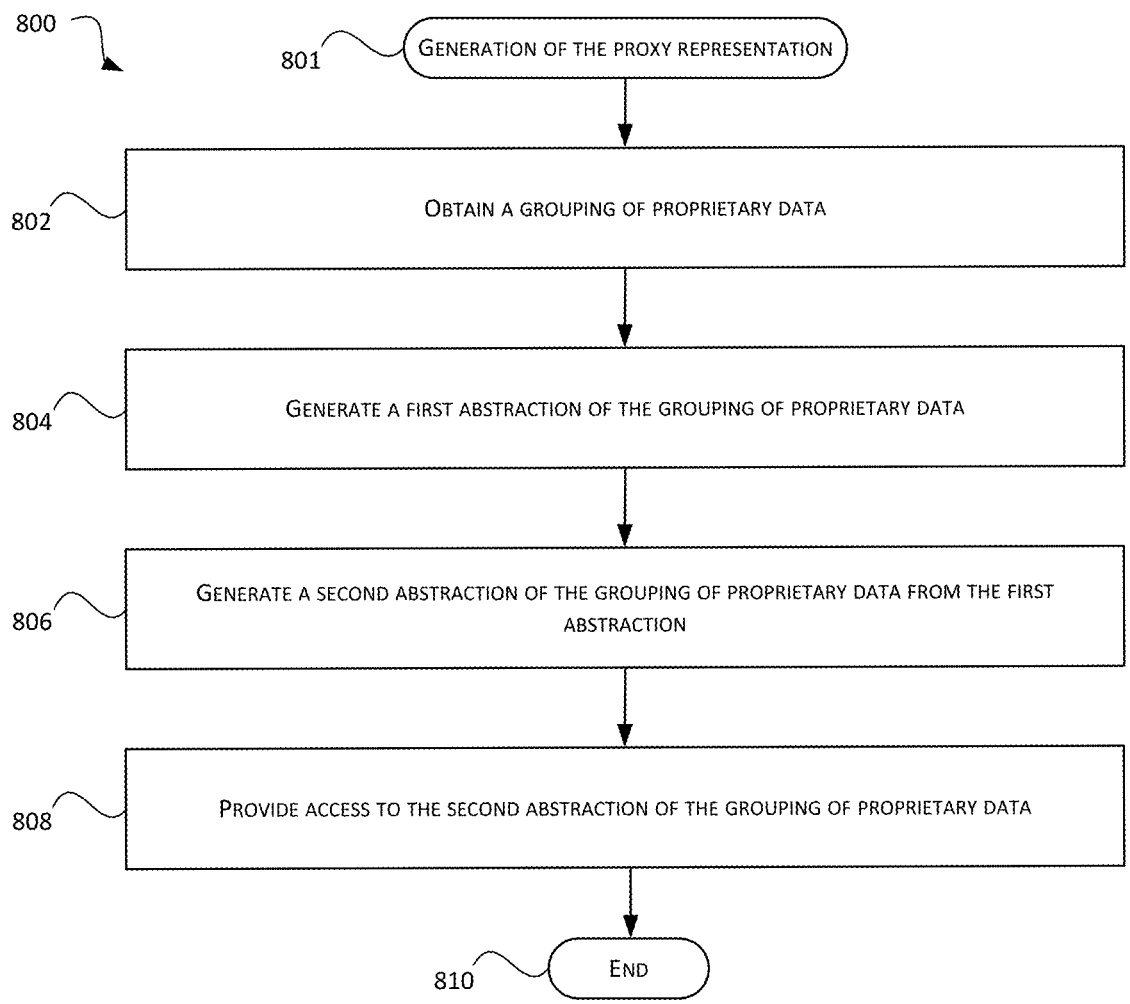
FIG. 8 is a flowchart of an example routine for generating a proxy representation.

FIG. 8 presents a flowchart of an embodiment of a proxy generation process 800 in accordance with certain aspects of the present disclosure. The process 800 includes generating a proxy representation using a multi-layered abstraction process. By using such a multi-layered abstraction process, access to the private data set may be protected. The process 800 can be implemented by any system that can generate a proxy representation of a private data set. The process 800, in whole or in part, can be implemented by, for example, a data generation system 102, a proxy generation system 104, a client computing system 106, a proxy generation system 200, a proxy representation generator 202, among others. Although any number of systems, in whole or in part, can implement the process 800, to simplify discussion the process 800 will be described with respect to particular systems.

The process 800 can begin at block 801. Upon initiation of the process, at block 802, the proxy generation system 104 obtains a grouping of proprietary data. In some embodiments, the proxy generation system 104 may generate the grouping of proprietary data. The grouping of proprietary data may correspond to an exchange traded fund including multiple bonds. For example, the grouping of proprietary data may correspond to an exchange traded fund including hundreds of bonds, thousands of bonds, etc. Therefore, the proxy generation system 104 may obtain the grouping of proprietary data including private information.

At block 804, the proxy generation system 104 generates a first abstraction (e.g., encryption) of the grouping of proprietary data. The proxy generation system 104 may generate the first abstraction by selecting a group of characteristics of the proprietary data as representative of the grouping of proprietary data. The proxy generation system 104 may select a subset of the characteristics of the proprietary data. Further, the proxy generation system 104 may select the characteristics based on the explanatory rating of the characteristics. For example, the proxy generation system 104 may select the characteristics with the highest explanatory rating. In some embodiments, the proxy generation system 104 may generate the first abstraction by translating the grouping of proprietary data into the characteristics (e.g., risk factors) that are indicative of the first grouping of proprietary data without enabling the replication of the grouping of proprietary data. In order to generate the first abstraction, the proxy generation system 104 can decompose the grouping of proprietary data into a plurality of components (e.g., a plurality of raw and/or granular risk components, a plurality of risk buckets, etc.). Therefore, the proxy generation system 104 may generate the first abstraction.

At block 806, the proxy generation system 104 generates a second abstraction of the grouping of proprietary data from the first abstraction. The second abstraction of the grouping of proprietary data may be based at least in part on the first abstraction (e.g., the second abstraction is generated from the first abstraction). Further, the first abstraction and the second abstraction may form a multi-level abstraction process. The proxy generation system 104 may generate the second abstraction by selection of a group of characteristics that share particular similarities with the identified characteristics of the proprietary data. In order to generate the second abstraction of the grouping of proprietary data, the proxy generation system 104 can recompose the decomposed components of the grouping of proprietary data into liquid factors in optimized amounts. Therefore, the proxy generation system 104 may generate the second abstraction.

At block 808, the proxy generation system 104 provides access to the second abstraction of the grouping of proprietary data. The proxy generation system 104 may provide the access in response to a request from a user for information about the proprietary data. In some embodiments, the proxy generation system 104 may periodically or aperiodically update and provide access to the second abstraction of the grouping of proprietary data (e.g., every day). Therefore, the proxy generation system 104 may provide access to the second abstraction of the grouping of proprietary data. The process 800 may end at block 810.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method of generating a proxy representation of a set of private data enabling a user to determine characteristics of the set of private data without accessing the set of private data, the method comprising:
   as implemented by an interactive computing system configured with specific computer-executable instructions,
   accessing a first data set comprising a set of private data that is accessible by the interactive computing system, but that is not accessible to a user;
   receiving a characteristics pool that specifies a set of characteristics associated with at least some data included in the set of private data;
   determining a first set of characteristics of the first data set, wherein the first set of characteristics are determined based at least in part on content of the first data set and the set of characteristics included in the characteristics pool;
   accessing a data library comprising public data that is accessible to the user;
   generating an encryption of the first data set by determining from the data library a second data set based at least in part on the first set of characteristics, wherein the second data set is associated with a second set of characteristics that have at least a threshold degree of similarity to the first set of characteristics;
   receiving, via a user interface, a request for presentation to the user of data associated with the first data set; and
   in response to the request, outputting the second data set for presentation to the user enabling the user to access a proxy representation of the first data set in place of accessing the first data set based at least in part on the encryption of the first data set.

2. The computer-implemented method of claim 1, wherein the first data set comprises an identity of a plurality of fixed income components.

3. The computer-implemented method of claim 1, wherein the first set of characteristics comprises one or more indications of a first set of risk factors, wherein the second set of characteristics comprises one or more indications of a second set of risk factors.

4. The computer-implemented method of claim 1, wherein the first set of characteristics and the second set of characteristics comprise an indication of one or more of:
   a developed market currency risk;
   an emerging market currency risk;
   an emerging market interest rate risk;
   a developed market interest rate risk;
   a sovereign credit risk;
   a prepayment credit risk;
   a breakeven credit risk;
   a municipal credit risk;
   an inflation breakeven credit risk;
   an emerging market external credit risk;
   a mortgage-backed securities credit risk;
   an asset-backed securities credit risk;
   a high yield corporate credit risk; or
   an investment grade credit risk.

5. The computer-implemented method of claim 1, further comprising:
   determining a variance indicator, the variance indicator indicating a variance between the first set of characteristics and the second set of characteristics.

6. The computer-implemented method of claim 5, further comprising:
   obtaining a bid ask spread based at least in part on the variance indicator.

7. The computer-implemented method of claim 5, further comprising:
   based at least in part on the variance indicator, determining a precision rate for the second set of characteristics, wherein the precision rate corresponds to a rate of precision of the second set of characteristics in predicting a behavior of the first data set; and determining that the precision rate is within a threshold range, wherein outputting the second data set for presentation to the user is based at least in part on determining that the precision rate is within the threshold range.

8. The computer-implemented method of claim 1, wherein the first set of characteristics comprises at least one characteristic included in the second set of characteristics.

9. The computer-implemented method of claim 1, wherein the second set of characteristics comprise an identity of one or more liquid instruments.

10. The computer-implemented method of claim 1, wherein the first set of characteristics indicate a volatility of a return of the first data set.

11. The computer-implemented method of claim 1, wherein each characteristic of the second set of characteristics is associated with a weight, wherein a particular weight indicates an exposure of the first data set to a particular characteristic of the second set of characteristics.

12. The computer-implemented method of claim 1, wherein a return associated with the first set of characteristics corresponds to a return associated with the second set of characteristics.

13. A system comprising
a data store storing computer executable instructions, and one or more computing devices configured to:
   access a first data set comprising a set of private data that is accessible by the one or more computing devices, but that is not accessible to a user;
   receive a characteristics pool that specifies a set of characteristics associated with at least some data included in the set of private data;
   determine a first set of characteristics of the first data set, wherein the first set of characteristics are determined based at least in part on content of the first data set and the set of characteristics included in the characteristics pool;
   access a data library comprising public data that is accessible to the user;
   generate an encryption of the first data set by determining from the data library a second data set based at least in part on the first set of characteristics, wherein the second data set is associated with a second set of characteristics that have at least a threshold degree of similarity to the first set of characteristics;
   receive, via a user interface, a request for presentation to the user of data associated with the first data set; and
   in response to the request, output the second data set for presentation to the user enabling the user to access a proxy representation of the first data set in place of accessing the first data set based at least in part on the encryption of the first data set.

14. The system of claim 13, wherein the first data set comprises an identity of a plurality of fixed income components.

15. The system of claim 13, wherein the first set of characteristics and the second set of characteristics comprise an indication of one or more of:
   a developed market currency risk;
   an emerging market currency risk;
   an emerging market interest rate risk;
   a developed market interest rate risk;
   a sovereign credit risk;
   a prepayment credit risk;
   a breakeven credit risk;
   a municipal credit risk;
   an inflation breakeven credit risk;
   an emerging market external credit risk;
   a mortgage-backed securities credit risk;
   an asset-backed securities credit risk;
   a high yield corporate credit risk; or
   an investment grade credit risk.

16. The system of claim 13, wherein the one or more computing devices are further configured to:
   determine a variance indicator, the variance indicator indicating a variance between the first set of characteristics and the second set of characteristics;
   based at least in part on the variance indicator, determine a precision rate between the second set of characteristics and the first set of characteristics, the precision rate indicating a precision between the first set of characteristics and the second set of characteristics; and
   determine that the precision rate is within a threshold range;
   wherein outputting the second data set for presentation to the user is based at least in part on determining that the precision rate is within the threshold range.

17. A computer-implemented method of generating a proxy representation of a set of fixed income assets enabling a user to determine risk characteristics of the set of fixed income assets without accessing the set of fixed income assets, the method comprising:
   as implemented by an interactive computing system configured with specific computer-executable instructions,
      accessing private fund data associated with a private fund comprising a set of fixed income assets, wherein the private fund data is accessible by the interactive computing system and not accessible to a user;
      receiving a risk factor pool that specifies a set of risk factors associated with at least some fixed income assets of the private fund;
      determining a first set of risk factors associated with the private fund based at least in part on the private fund data and the set of risk factors included in the risk factor pool;
      accessing a fixed income library comprising a set of fixed income assets, wherein the fixed income library is accessible to the user;
      generating an encryption of the private fund data by determining from the fixed income library a proxy representation of the private fund based at least in part on the first set of risk factors, wherein the proxy representation of the private fund comprises an identity of one or more fixed income assets of the fixed income library, and wherein a second set of risk factors associated with the proxy representation of the private fund have at least a threshold degree of similarity to the first set of risk factors;
      receiving, via user interface, a request for presentation to the user of data associated with the private fund; and
      in response to the request, outputting the proxy representation of the private fund to the user enabling the user to determine a risk level of the private fund without having access to the private fund data based at least in part on the encryption of the private fund data.

18. The computer-implemented method of claim 17, wherein the first set of risk factors and the second set of risk factors comprise an identity of one or more of:
- a developed market currency risk;
- an emerging market currency risk;
- an emerging market interest rate risk;
- a developed market interest rate risk;
- a sovereign credit risk;
- a prepayment credit risk;
- a breakeven credit risk;
- a municipal credit risk;
- an inflation breakeven credit risk;
- an emerging market external credit risk;
- a mortgage-backed securities credit risk;
- an asset-backed securities credit risk;
- a high yield corporate credit risk; or
- an investment grade credit risk.

19. The computer-implemented method of claim 17, wherein each risk factor of the second set of risk factors is associated with a weight, wherein a particular weight indicates an exposure of the private fund to a particular risk factor of the second set of risk factors.

20. The computer-implemented method of claim 17, wherein the first set of risk factors comprises at least one risk factor included in the second set of risk factors.

* * * * *